United States Patent
Haisma

[11] Patent Number: 6,054,969
[45] Date of Patent: *Apr. 25, 2000

[54] THREE-DIMENSIONAL IMAGE DISPLAY SYSTEM

[75] Inventor: Jan Haisma, Valkenswaard, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/612,154

[22] Filed: Mar. 7, 1996

[30] Foreign Application Priority Data

Mar. 8, 1995 [EP] European Pat. Off. .............. 95200568

[51] Int. Cl.$^7$ ...................................................... G09G 5/00
[52] U.S. Cl. .................................. 345/7; 345/9; 345/139
[58] Field of Search .............................. 345/7, 6, 8, 147, 345/151, 419, 139, 427, 426, 435, 113, 9

[56] References Cited

U.S. PATENT DOCUMENTS

| | | | |
|---|---|---|---|
| 3,891,305 | 6/1975 | Fader | 350/144 |
| 4,190,856 | 2/1980 | Ricks | 358/88 |
| 4,517,558 | 5/1985 | Davids | 340/700 |
| 4,943,938 | 7/1990 | Aoshima et al. | 364/522 |
| 4,985,756 | 1/1991 | Kawabe et al. | 358/22 |
| 5,086,354 | 2/1992 | Bass et al. | 359/465 |
| 5,113,272 | 5/1992 | Reamey | 359/53 |
| 5,570,208 | 10/1996 | Kato et al. | 359/23 |
| 5,589,980 | 12/1996 | Bass et al. | 359/478 |
| 5,644,414 | 7/1997 | Kato et al. | 359/22 |

FOREIGN PATENT DOCUMENTS

0602934A2  6/1994  European Pat. Off. ........ G02B 27/22

OTHER PUBLICATIONS

Computer Graphics:Principles and Practice by Foley et al, Addison–Wesley series (p. 610–611), Dec. 1990.

*Primary Examiner*—Richard A. Hjerpe
*Assistant Examiner*—Ronald Laneau

[57] ABSTRACT

A three-dimensional image display system, based on a novel depth concept referred to as Double-D-Depth, includes a first display device (3) and at least a second display device (4) which, viewed along the system axis (9-91), are offset with respect to each other and are each intended to partially display the same two-dimensional image of a scene, while parameters which are relevant to depth representation are included in the form of an additional dedicated intensity gradation in at least one of the displayed images, and all images, together with the axial distance (□L) in between, evoke a depth effect with a viewer (10).

24 Claims, 20 Drawing Sheets

THREE-DIMENSIONAL IMAGE DISPLAY SYSTEM

BACKGROUND OF THE INVENTION

1. Field of the Invention

The invention relates to a three-dimensional image display system having a system axis which extends from a light-generating element to an observation window, said image display system being provided with at least two image display devices which are congruently aligned with each other and placed at different positions along the system axis, and are provided with a control circuit.

2. Description of the Related Art

An image display device is herein understood to mean a device for converting an electric image signal presented to the control circuit of this device into a visible image. Such a device may be constituted by, for example, a cathode ray tube or by an image display panel which is provided with a layer of liquid crystalline material and whose operation is based on a change of the state of polarization of light incident thereon, or an image display panel which is provided with a polymer layer in which cells of liquid crystalline material are dispersed and whose operation is based on light scattering. Such panels are placed one behind the other on the system axis. When cathode ray tubes are used, these tubes may be placed, for example, in such a way that their face plates are situated in mutually perpendicular planes, and the images from these tubes can be combined with, for example, a partially transmissive mirror which is placed, for example, at an angle of 45□ to said planes. This mirror combines the (sub-)axes of the tubes to one system axis which extends as far as the observation window.

In a three-dimensional image display system with cathode ray tubes, these tubes are also light-generating elements. In a system with liquid crystalline image display panels, the light-generating element is a radiation source unit which illuminates the panels.

The observation window may be a physical window, i.e., a light-transmissive aperture in an envelope in which the various components of the image display system are accommodated, but also an imaginary window, i.e., a plane which marks the beginning of the audience space and in which the image is formed.

The fact that the image display devices are aligned congruently with respect to each other means that not only the centers of the images formed by these image display devices are coaxial, but also corresponding image components are in registry. The image surfaces themselves of the image display devices need not be mutually parallel in that case.

There is a great need of three-dimensional image display systems, particularly in medical diagnostic techniques, notably, when analyzing and visually representing image information obtained by means of X-ray tomography or a magnetic resonance technique, but also in diagnostic systems using sound waves, positron emission tomography, ECT (Emission Computed Tomography) or MMI (MultiModal Imaging). Moreover, there is a need of three-dimensional image display systems for displaying computer-generated images, i.e., computer graphics. An effective three-dimensional image display system will not only be a breakthrough in these professional fields, but also in the field of consumer uses, notably for TV apparatus and multimedia systems. Such a system should be user-friendly, i.e., it should be able to work without the viewer needing auxiliary means, such as polarizing spectacles, and it should be suitable for a plurality of users watching at the same time and thus have, for example, a large viewing angle.

A three-dimensional image display system of the type described in the opening paragraph is known from, for example, U.S. Pat. No. 5,113,272. The system described in this patent comprises at least two, but preferably a much larger number of image display panels which are preferably based on light scattering. The three-dimensional effect must be obtained by displaying, with the given number of panels, an equally large number of images of object cross-sections in planes perpendicular to the system axis so that, when viewed from the viewer, the successive images cover, for example an increasingly larger or smaller surface area of the associated panels. This is dependent on whether the object to be displayed becomes wider or narrower in said direction. The three-dimensional effect is based on parallax simulation and, to obtain a sufficiently strong effect, the different, scattering or liquid crystalline layers should be placed at sufficiently large distances from each other. Moreover, there should be a sufficiently large number of these layers, up to twenty, so that only a small part of the illumination beam intensity can reach the viewer.

OBLECTS AND SUMMARY OF THE INVENTION

The present invention provides a novel concept for a three-dimensional image display system with which a convincing depth effect is obtained, which requires only a small number of image display devices, and can be realized with different types of display devices. The three-dimensional image display system according to the invention is characterized in that each image display device is intended to partially display the same two-dimensional image of a scene, in that parameters which are relevant to depth representation are comprised in the form of a dedicated intensity gradation in at least one of the displayed images, in that all displayed images together, and in combination with the axial distance between the image display devices, evoke a depth effect with a viewer, and in that the dedicated intensity gradation is defined by one or more of the following scene parameters:

the depth position of scene components
the height of scene components
the thickness of scene components
the distance between scene components.

A convincing depth effect is obtained by using a plurality of, (e.g., for example two) image display devices which, viewed from the audience space, are arranged at different positions along the system axis and display a partial image each. The partial display of one and the same image is understood to mean that certain image parts of an image are displayed on one image display panel and other parts of the same image are displayed on another image display panel. By providing a dedicated intensity gradation in at least one of the images, it is prevented that the front portion of the scene, or proximate components of the scene, seem to be floating above the rest of the displayed scene, which would give an unnatural impression. The dedicated intensity gradation is an additional intensity gradation which is independent of the two-dimensional image contents.

By combining the above-mentioned features of generating two partial images by means of axially separated image display devices, and the intensity gradation, a new depth sensation is obtained which has proven to be able to evoke a natural three-dimensional image. This depth sensation, which can be characterized as a distance-determined depth sensation based on gradation, or as distance-determined depth "Double-D-Depth", a trademark assigned to Philips Electronics, is also monocular, i.e., the effect can also be observed with one eye so that the generated three-dimensional image can be observed from different angles. The invention provides a novel, physiological depth parameter, or depth cue. The systems formerly and currently used to generate three-dimensional images are generally stereoscopic systems using the distance between the eyes of an observer, and thus, having a small viewing angle interval. In stereoscopic systems, the observed depth increases with an increasing distance between the observer and the image, this effect being rapidly disturbing from a perceptive point of view. This problem does not occur in the "Double-D-Depth" system.

It is to be noted that U.S. Pat. No. 3,891,305 describes an apparatus for simulating a three-dimensional image, in which a plurality of image panels is used. In addition to one or two panels generating an image, for example, LCD panels, the apparatus comprises extra panels for generating an alternation of light-transmissive strips and image strips, these image strips containing the same image information as the corresponding strips of the image formed by the image-generating panels. The images which are displayed by the image-generating panels have been picked up from different angles. None of the panels has a gradation defined by depth information. This apparatus operates as a stereoscopic apparatus and has the inherent drawbacks. It does not supply a three-dimensional image which is based on an intensity gradation defined by depth information.

It is further to be noted that U.S. Pat. No. 4,985,756 describes an electronic processor for obtaining special effects in a video image, such as fading in and out image portions. To enhance the special effect, the front surface area of an object may be given a greater brightness than the rest of this object, or the rest of the image, so as to simulate a three-dimensional effect. Only one image display device is used for displaying the image with the special effect.

In principle, two image display devices can be used in the image display system according to the invention, in which only one device generates an image having a dedicated intensity gradation, while the other device generates a two-dimensional image. However, the image display system according to the invention is preferably further characterized in that all images generated by the image display devices have dedicated intensity gradations which are different for the different images.

Consequently, a natural three-dimensional effect is achieved. By gradation in the correct manner, parallax in the observed image is obviated or prevented. The depth effect is achieved by the distance between the image display devices and is not dependent on the distance between the observer and the image.

An optimum effect is achieved with an image display system which is further characterized in that the dedicated intensity gradations in the images generated by two consecutive image display devices are complementary to each other.

Complementary is herein understood to mean that the intensity gradations in corresponding parts of the two images are opposed to each other. For example, the extra intensity in a part of a first image may decrease from bottom to top, whereas the intensity in the corresponding part of the second image decreases from top to bottom.

A preferred embodiment of the three-dimensional image display system is further characterized in that the product of the dedicated intensity gradations per pixel is equal to the intensity of the original two-dimensional image.

Since the actual image and the depth information are now fully integrated, the displayed image has a very natural appearance.

The three-dimensional image display system may be further characterized in that the distance between the image display devices, viewed from the observation window, is equal to a fraction f of the diagonal of the image surface areas of the image display devices, in which it holds for f that:

$$\frac{1}{1000} \leq f \leq \frac{1}{10}$$

This choice of the distance prevents the depth from being experienced as exaggerated so that it becomes too disturbing. A disturbing depth experience is completely prevented in an image display system which is further characterized in that it holds for f that:

$$\frac{1}{75} \leq f \leq \frac{1}{25}$$

The image planes in the image display device, for example, the face plates of cathode ray tubes or the faces of LCD panels, may be parallel to each other, i.e., the f value is constant throughout the image surface areas.

However, the image display system may be further characterized in that, when viewed in the direction of the system axis, the image surface areas of the image display devices extend at an acute angle to each other.

Provided that corresponding image parts are satisfactorily in registry, a satisfactory three-dimensional image can also be obtained with this image display system.

In accordance with a further aspect, the image display device according to the invention is characterized by a synchronizing circuit for driving the image display devices via their control circuits in such a way that their images are displayed simultaneously.

The images can then be displayed at a video rate of one hundred, fifty, twenty-five or thirty frames per second and no additional requirements are imposed on the control circuits. If the image display devices are cathode ray tubes, the three-dimensional image may additionally have a high brightness. In the LCD implementations with image display panels, the desired brightness can be obtained by giving the radiation source a sufficiently large power.

As an alternative, the image display system can be characterized by a synchronizing circuit for driving the image display devices via their control circuits in such a way that their images are alternately displayed one after the other in time at a frequency which is larger than the frequency which can be detected by the human eye.

Since the sub-images are displayed at different instants, disturbing Moiré effects can be prevented.

In order that the depth information obtained during picking up a scene is processed correctly, the three-dimensional image display system is further characterized in that the control circuit of each image display device has a first input for receiving a two-dimensional image information signal, and a second input for receiving a depth information signal, and further comprises an image mixer for combining the signals to one image signal. The depth information is thus integrated with the actual image information.

In accordance with a further aspect of the invention, the three-dimensional image display system is characterized in that at least one image formed by an image display device is curved in such a way that the edges of this image are located closer to the observation window than the center of said image.

Due to this measure, the three-dimensional effect, evoked by the combination of intensity gradation in, and the distance between the images, which effect may also be referred to as the differential fractal depth effect and occurs in the direction which is vertical to the viewer, is complemented with a depth effect in the horizontal direction if the image curvature extends in the horizontal direction. The curvature may also extend in the vertical direction. Then, the differential fractal depth effect is enhanced. The image, or images, may alternatively be curved in the two directions and then both the fractal depth effect is geometrically complemented and the depth perspective is enhanced.

If one or more of the image display devices are cathode ray tubes, said image curvatures can be realized by adapting the face plate of the tube, or by placing a transparent curved plate having a refractive index different from that of the window material in front of a normal tube. If the image display devices are display panels, curved images can be obtained by giving these panels a curved shape or by placing a plate having a curved surface in front of a flat panel.

A further embodiment of the three-dimensional image display system is characterized in that the images generated by the image display devices have a monotonous intensity gradation extending from the center of the images towards their edges, the monotonous intensity gradation in the images of two consecutive image display devices being complementary to each other, said image of said image display device which is most proximate to the observation window having the highest intensity at the edges.

By integration of an extra, monotonous intensity variation in the actual image in such a way that, for example, for the image of the front image display device, the intensity in the center is minimal and maximal at the edges, an effect, which is similar to that of a curved image, is obtained so that the effect obtained by fractal depth in the vertical direction is enhanced and/or complemented with a horizontal effect.

This embodiment may be further characterized in that the monotonous intensity gradations in the images extend in the radial direction. An image convergence towards the audience is then simulated in all directions in the plane of the image. Alternatively, this embodiment may be characterized in that the monotonous intensity gradations extend in two mutually perpendicular directions which are perpendicular to the system axis.

An image which is curved in two directions is then simulated.

It is to be noted that U.S. Pat. No. 4,517,558 proposes simulation of a three-dimensional effect by arranging a plate in front of a cathode ray tube, this plate having a gradually decreasing transmission from the center towards the lower and upper sides. In this case, the intensity of the image formed by the cathode ray tube is not varied monotonously, and only one image display device is used, so that the fractal depth principle is not applied.

In addition to the three-dimensional display of full scenes, the invention may also be used for visualizing the volume of an object. A three-dimensional image display system with which this is possible is characterized in that, of the object images generated by the image display devices, which images display represent different cross-sections in accordance with planes perpendicular to the system axis, the contours are represented by intensity gradations within the circumference of the object images and in directions transverse to the local contour lines.

In this case, use is made of the fact that the volume or the shape of an object or body is observed as an increase or a decrease of the thickness or height of the displayed image of the object. By making use of two or more image display devices which generate images in which dedicated intensity gradations are integrated which are complementary for the different images and extend in directions perpendicular to the local contour lines, a surprisingly good three-dimensional image is obtained in which even round shapes of object parts are visible.

It is to be noted that U.S. Pat. No. 5,055,918 describes an electronic module which processes a video signal coming from, for example, a graphic computer and to be applied to, for example, a TV monitor, in such a way that given peripheral portions of image parts in the displayed image have a one-sided intensity gradation without actual depth so as to emphasize the distance between these parts. However, the displayed image is not a three-dimensional image and the fractal depth principle is not used.

To prevent the viewing angle of the viewers of the three-dimensional image from being limited by parallax, which may result from displaying one and the same image with two axially offset image display devices, the image display system according to the invention may be further characterized in that the first image display device displays the two-dimensional image in first time intervals and displays a first depth image defined by depth cues in second time intervals, located between the first time intervals, and in that at least a second image display device displays in third time intervals a second depth image defined by depth cues and being complementary to the first depth image.

A depth image is understood to mean a quasi-image in the form of an intensity gradation which is determined by depth cues of a scene.

In the last-mentioned embodiment, only one, viz., the first image display device, is used for displaying the actual two-dimensional image, so that this image cannot exhibit any parallax. To create a three-dimensional effect, both the first and the second, and possibly further display devices, are used in those time intervals in which the actual image is not displayed. In this way, the luminance, or brightness, and the telominance, or the depth profile, are separated from each other in time, while the image displayed is prevented from exhibiting parallax and/or Moiré.

The lengths of the first, second and third time intervals, and the frequency at which they succeed each other, are chosen to be such that the image changes cannot be detected by the human eye. The second and third time intervals may coincide, so that the complementary depth images are represented simultaneously. With separated second and third time intervals, the occurrence of Moiré effects between the depth images can be prevented.

To adapt the fractal depth effect to the personal need of a viewer, the image display system according to the invention may be further characterized in that a first and a second image display device are interconnected via adjustable spacers.

By means of these spacers, the axial distance, and hence, the optical path length, between the two image display devices, for example, two LCD panels or a CRT and an LCD panel, may be changed by the viewer in a mechanical, manual or electromechanical way, so that the displayed image is as natural as possible for the viewer.

For the same purpose and other purposes, the image display system may alternatively or additionally be characterized in that the medium between two image display devices has adjustable optical properties.

This medium may be a liquid crystalline material which is enclosed between two light-transmissive electrode configurations. By selectively energizing the electrodes, the refractive index of the medium, and hence, the optical path length between the two image display devices, can be locally changed so that the depth effect can be enhanced.

The medium may alternatively be a polymer in which drops of a liquid crystalline material have been dispersed, this polymer being enclosed between two light-transmissive electrode configurations. By selectively energizing the electrodes, the medium can be rendered locally diffusive or not diffusive so that parts of the scene, or of objects therein, can be accentuated, or a background can be made vaguer.

The medium may alternatively be an electrochromic liquid which is enclosed between two light-transmissive electrode configurations. By selectively energizing the electrodes, the color contrast in the displayed image can then be locally increased, or the volume character of objects in the scene can be accentuated.

The medium may alternatively be an organic visco-elastic or elastomer material, such as silicone rubber or polyvinylcarbozole-trinitro-fluoronone. By locally applying a voltage across this material, the material is deformed so that a relief is produced which enhances the depth effect, or with which contour interfaces can be visualized.

The present invention may be realized by means of different image display devices.

A first embodiment of the image display system is characterized in that the image display devices are constituted by cathode ray tubes, in that n-1 beam combiners are provided, in which n is the number of tubes, for combining the light beams from the tubes to one beam whose beam axis coincides with the system axis, and in that the dedicated intensity gradations in the images of the tubes are realized by intensity variations in the electron beams within the tubes. The image displayed by this system has a high brightness.

An embodiment of the image display system, which has the advantage of a compact implementation, is characterized in that the image display devices are constituted by image display panels which are arranged one behind the other in the path of an illumination beam supplied by a radiation source and are centered with respect to the system axis, and in that the dedicated intensity gradations in the images of the panels are realized by variations of the light transmissiveness of the panels.

An embodiment of the image display system, in which the advantages of the two previous embodiments are combined as much as possible and the drawbacks are obviated as much as possible, is characterized in that the image display device which is farthest remote from the observation window is constituted by a cathode ray tube, while the other image display devices are constituted by image display panels, and in that the dedicated intensity gradation in the image of the tube is realized by intensity variations of the electron beam within the tube, while the dedicated intensity gradation in the depth image of an image display panel are realized by a variation of the light transmissiveness of the panel.

Said embodiment using cathode ray tubes as image display devices is preferably further characterized in that each beam combiner is constituted by a wide-band partially transmissive mirror consisting of a transparent substrate on which a relatively thin layer of silver and a thicker layer of silicon dioxide are successively provided.

This mirror has the advantage of being a wide-band mirror, i.e., it has constant properties in a large range of wavelengths, absorbs only a very small part of the light within a large range of viewing angles, for example, from −45□ to +45□ to the system axis, and no color shading or color variation occurs in the image observed through the mirror.

It is to be noted that European Patent Application 0 602 934, corresponding to U.S. Pat. No. 5,726,800, describes a three-dimensional image display system which is provided with two LCD panels positioned at an angle of 90° with respect to each other, whose images are combined to one image via a partially transmissive mirror which may be provided with a metal layer and a dielectric layer. The system described in this Application is, however, a stereoscopic system: the viewer's left eye watches one of the panels and his right eye watches the other. The images generated by these panels do not comprise any dedicated, depth-cue-determined intensity gradations.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
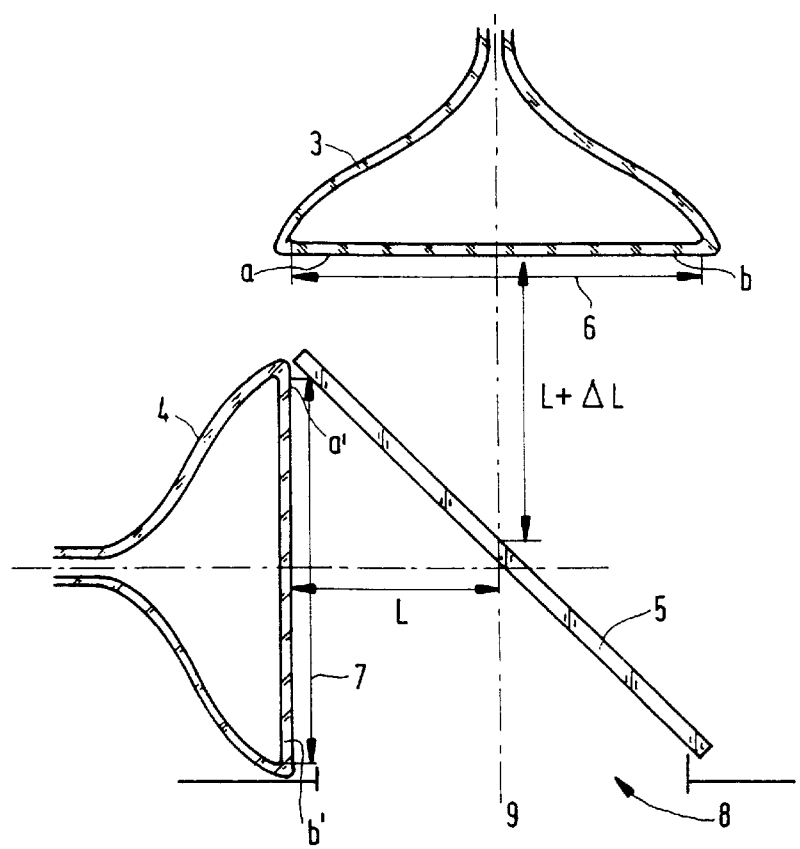
FIGS. 1, 2, 3 and 4 show a first, a second, a third and a fourth embodiment of the three-dimensional image display system according to the invention.

FIG. 1 shows, diagrammatically, a first embodiment of a display system according to the invention, comprising a first and a second image display device in the form of cathode ray tubes 3 and 4. The system is further provided with a beam combiner in the form of a partially transmissive mirror 5. This mirror passes a part of the light from the tube 3 to a viewer 10 and reflects a part of the light from the tube 4 to the same viewer. This viewer sees the images formed in the image windows 6 and 7 of the tubes 3 and 4 as one image, both in the case where the images are simultaneously present, and in the case where these images are displayed one after the other at a sufficiently high frequency, for example, 100 Hz.

The reference numeral 8 denotes an observation window which may be constituted by a light-transmissive window in a housing accommodating the components 3, 4 and 5, or an imaginary window which is bounded by the coinciding projections, in a plane directly below the mirror 5, of the face plates 6 and 7 of the tubes.

As the images should be aligned with each other at the location of the window 8, it should be ensured that image part a in the face plate 6 corresponds to image part a' in the face plate 7, and that image part b corresponds to image part b'.

As is shown in FIG. 1, the distance between the center of the face plate 6 and the center of the partially transmissive mirror is a fraction, $\Box L$, larger than the distance, L, between the center of the face plate 7 and the center of the mirror. Viewed in the direction of the system axis 9-9', hence in the axial direction, the images formed in the face plates are offset by a distance $\Delta L$. For this reason, and because the two images are partial images of one image and, moreover, are provided with depth information in a way to be described hereinafter, the viewer experiences a depth sensation and observes a three-dimensional image.

As is known, a cathode ray tube provides a clear image. Since two such images are combined, the image observed by the viewer has a high brightness in spite of the presence of the partially transmissive mirror. Instead of two cathode ray tubes, N cathode ray tubes may be used, in which case N-1 combining mirrors are required.

Figure 2:
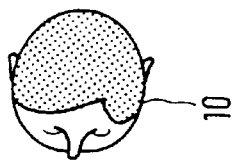
Figure 2:
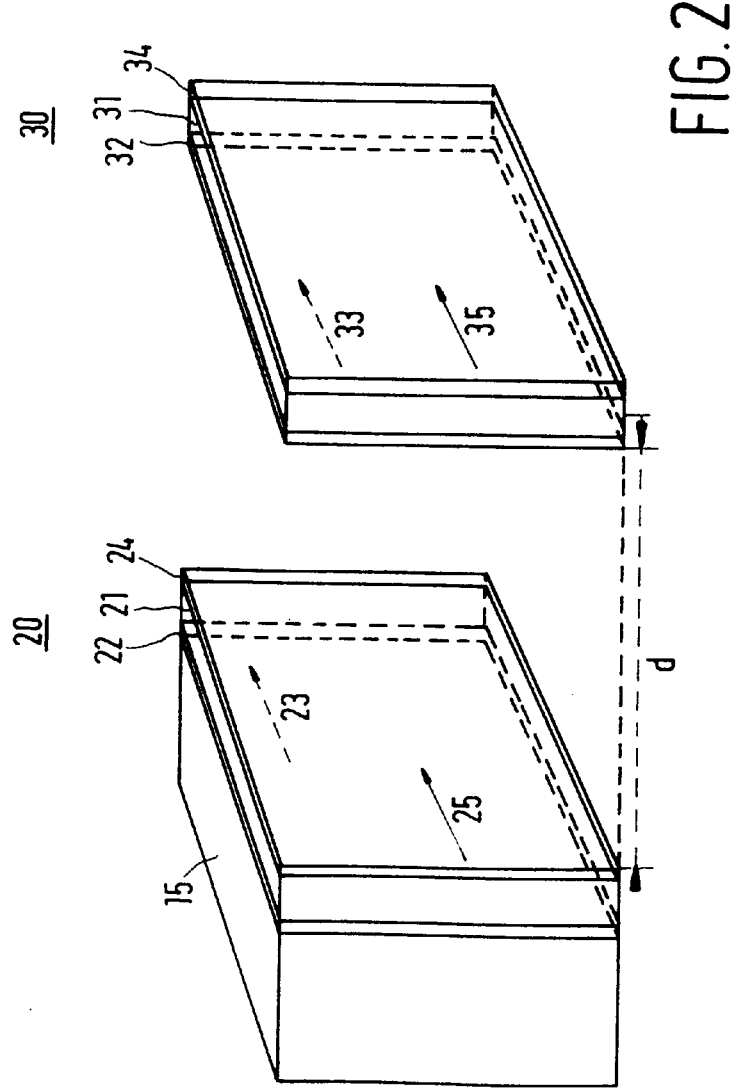

FIG. 2 shows an embodiment of the image display system in which the image display devices are constituted by image display panels, such as liquid crystalline display panels or LCDs 20 and 30. Each panel has a layer of liquid crystalline material 21, 31 preceded by a polarizer 22, 32 and followed by an analyzer 24, 34, respectively. The display panels are illuminated by an illumination unit 15. Such a unit comprises a lamp having a high brightness, for example, a very high pressure mercury lamp with a very small lamp arc as described in European Patent Application 576 071, corresponding to U.S. Pat. No. 5,497,049, assigned to Philips Electronics, a reflector at the rear side of the lamp, and possible further optical components for forming a suitable illumination beam. Such an illumination unit is known and does not form part of the present invention so that it need not be discussed here. This also applies to the operation of the LCD panel.

Since two or more panels are used one behind the other, it is preferable to drive these panels in such a way that the first panel shows its image in first time intervals, and the second panel shows its image in second time intervals located between the first time intervals. The duration of the time intervals and the frequency at which they succeed each other have been chosen to be such that the images of the panels cannot be observed separately and that there is no image flicker. Moreover, it is preferable to adapt the display panels in such a way that the panel is maximally transparent in the time intervals in which this panel does not display an image, so that the light modulated with the image information of the other panel is attenuated as little as possible by the first-mentioned panel. This means that when using panels whose pixels do not change the direction of polarization of the light in the unenergized state, the directions of polarization of the polarizer and the analyzer of that panel are parallel to each other for each panel, as is denoted by the arrows 23 and 25 in FIG. 2 for the first panel and the arrows 33 and 35 for the second panel.

Figure 3:
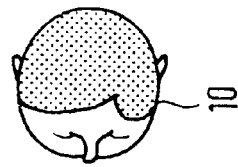
Figure 3:
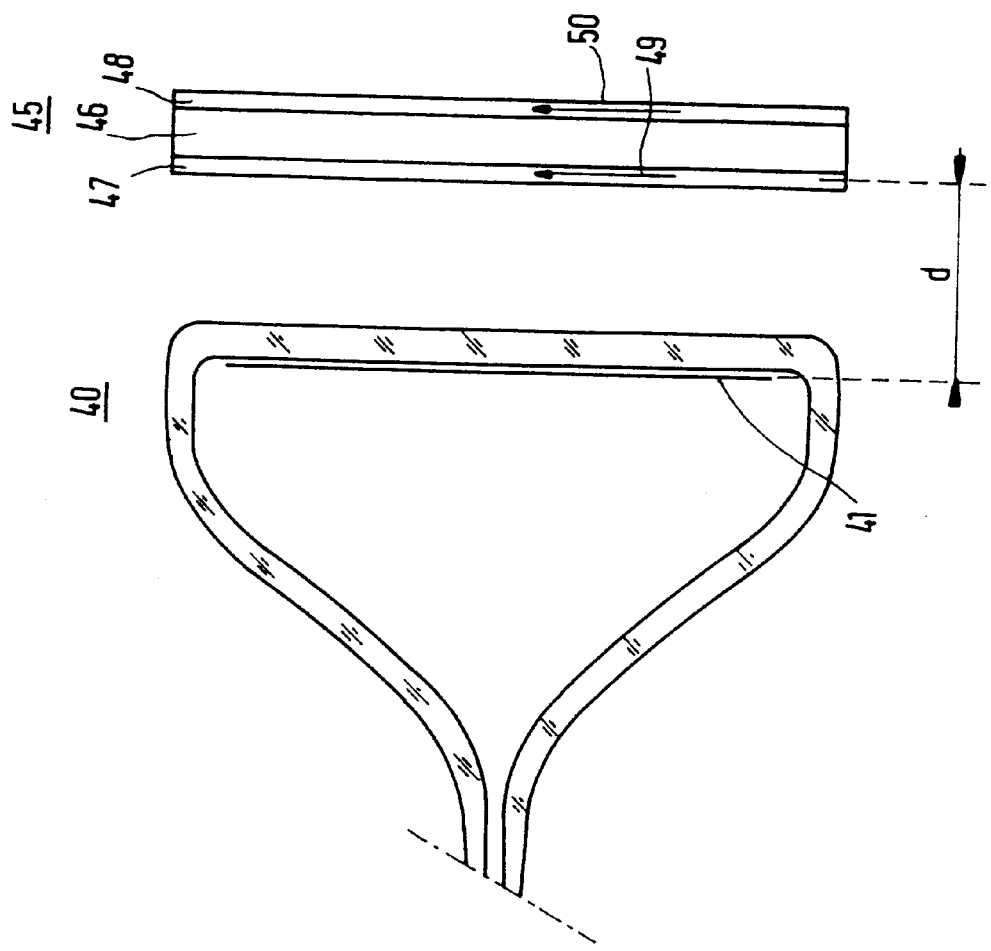

FIG. 3 shows a cross-section of a third embodiment of the image display system according to the invention. In this embodiment, the first image display device is a cathode ray tube 40 having a phosphor layer plus image window 41, and the second image display device is an LCD panel 45 having a polarizer 47, a liquid crystalline layer 46 and an analyzer 48. The directions 49 and 50 of polarization of the polarizer and the analyzer are again chosen to be such, for example, parallel to each other, that the panel has a maximum transmission in the time intervals in which it does not display an image, so that in these time intervals, light, which is modulated with the image information of the tube 40, is minimally attenuated. The cathode ray tube is driven in such a way that it has a maximum brightness in the time intervals in which it does not display an image and constitutes a satisfactory radiation source for illuminating the LCD panel which displays an image in said time intervals. The embodiment of FIG. 3 is more compact than that of FIG. 1 and may produce a brighter image than the embodiment of FIG. 2 which, in its turn, may be more compact than the embodiments of FIGS. 1 and 3.

Figure 4:
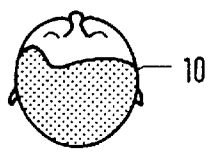
Figure 4:
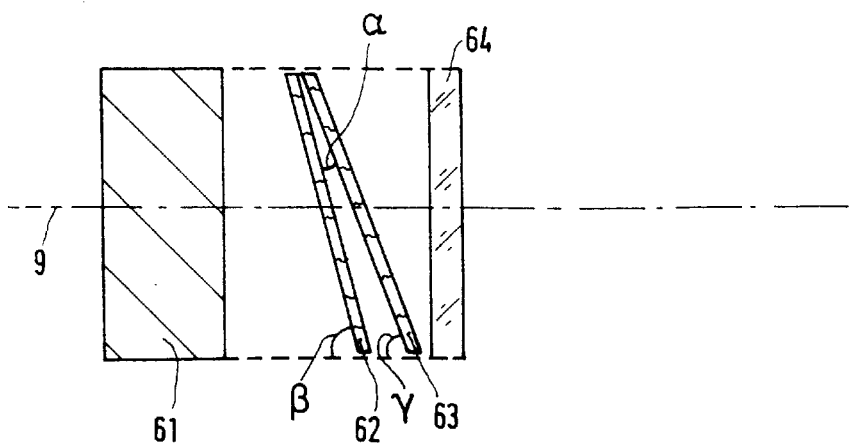
Figure 4:
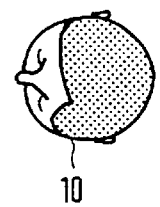

The image surfaces of the image display devices need not be parallel to each other but may also extend at an acute angle to each other, as is shown in FIG. 4. The system shown comprises an illumination unit 61, a first and a second LCD panel 62 and 63 and an observation window 64. The planes of the panels extend at an acute angle of, for example 10° to each other. As is shown in FIG. 4, both panels may extend at an acute angle, $\beta$ and $\gamma$, to the system axis 9-9'. However, it is alternatively possible that only one of the panels extends at an acute angle to this axis and that the other panel is perpendicular to this axis. However, it should be ensured that corresponding image portions of the display panels are in registry, i.e., viewed in a direction parallel to the system axis, they should cover each other. A satisfactory three-dimensional image can also be obtained with this embodiment, likewise as with a modification of the embodiment of FIG. 3, in which the panel 45 extends at an acute angle to the system axis, and also with a modification of the embodiment of FIG. 1 in which the face plates of the cathode ray tubes extend at an angle which is smaller than 90°.

Instead of LCD panels, other display panels may be used in the embodiments of FIGS. 2, 3 and 4 such as, for example, a PDLC panel which comprises a polymer layer in which drops of liquid crystalline material are provided, and whose operation is based on light scattering. In principle, such a panel need not comprise a polarizer and an analyzer. However, by adding these elements, an image having a higher contrast can be obtained. A PDLC panel is described in, for example, the article "A full colour TFT-LCD with polymer dispersed structure" in Japan Display 1992, pp. 931–934.

In principle, the invention may be realized with various types of image-generating devices.

Figure 5A:
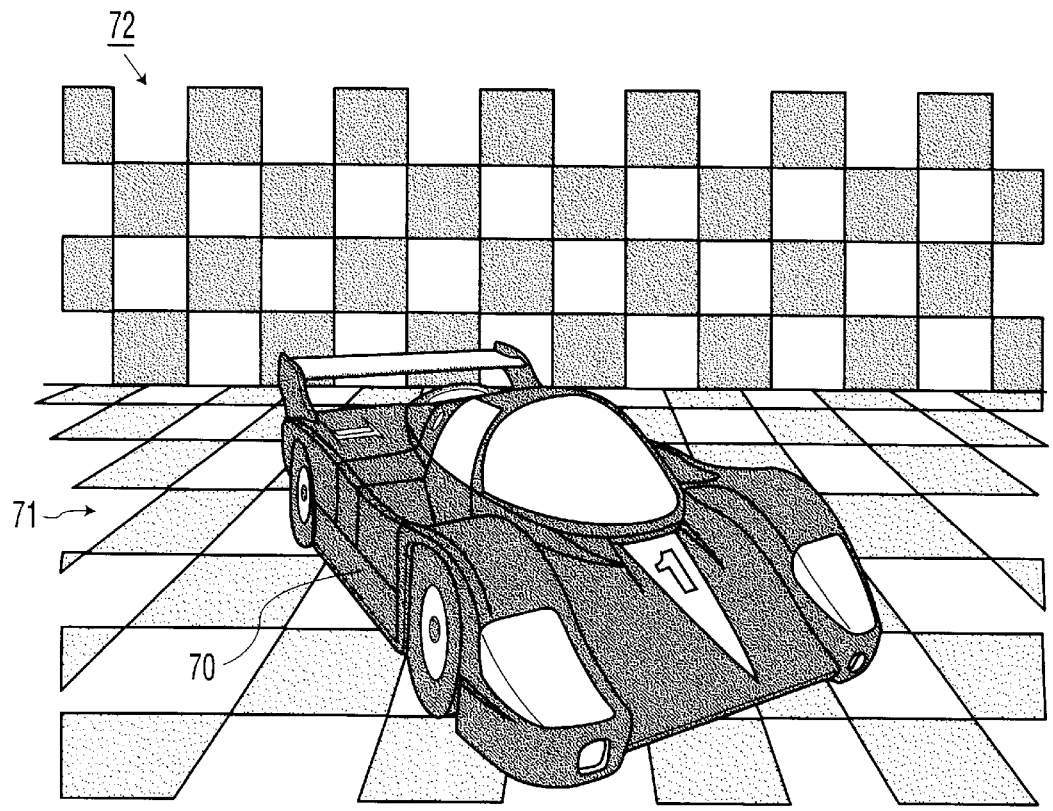
FIGS. 5a–5e show the Double-D-Depth principle used in these embodiments.
Figure 5B:
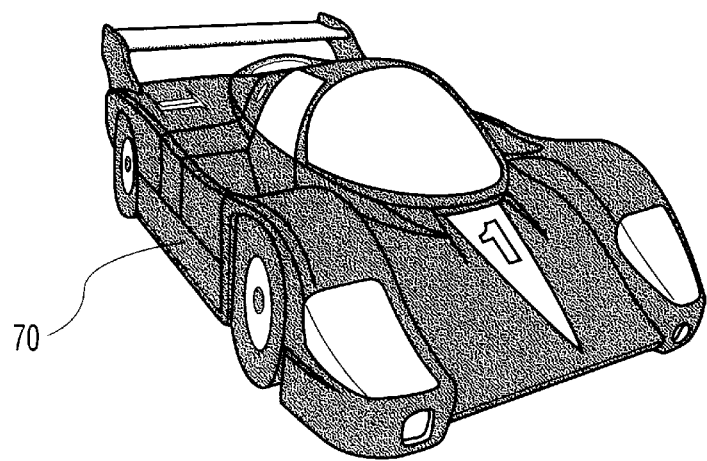
Figure 5C:
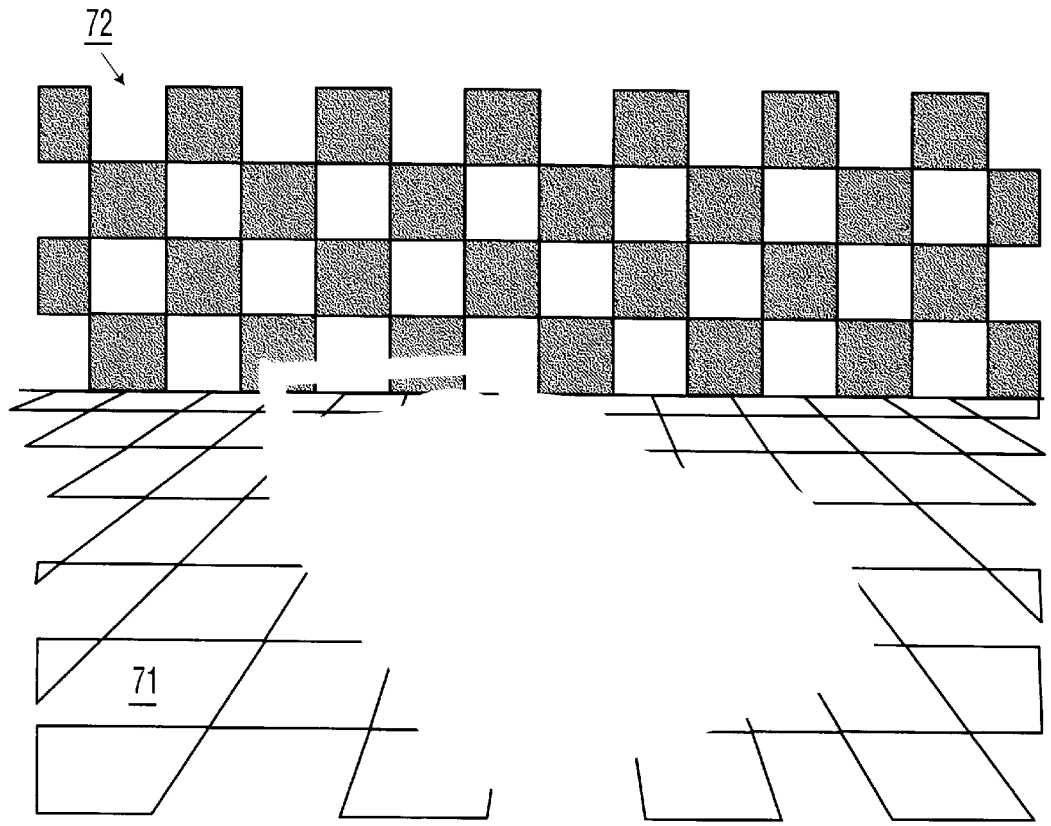

The Double-D-Depth principle may be elucidated with reference to the experiment illustrated in FIGS. 5a–5e. The starting point is FIG. 5a showing a racing car 70 in an ambience consisting of a tile floor 71 and a tiled rear wall 72. Two transparent foils shown in FIGS. 5b and 5c were made of this scene; FIG. 5b shows the racing car separately from its ambience and FIG. 5c shows this ambience only. If the foil of FIG. 5b is laid on the foil of FIG. 5c while a transparent glass or synthetic material plate is interpositioned and the whole assembly is illuminated from the side of the foil of FIG. 5c, a viewer watching from the side of foil of FIG. 5b experiences real depth in the scene jointly represented by the foils.

Figure 5D:
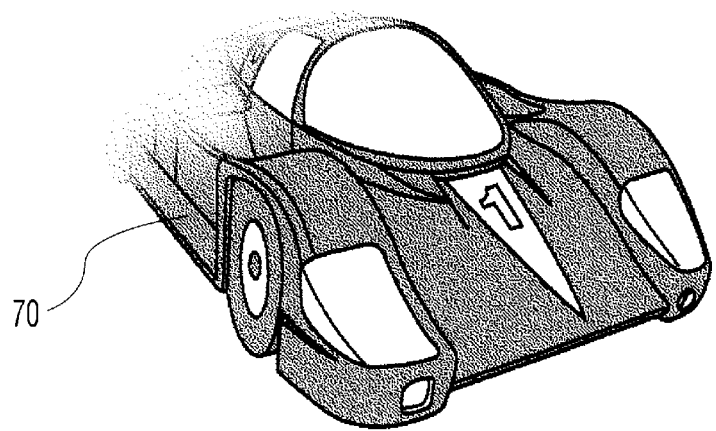
Figure 5E:
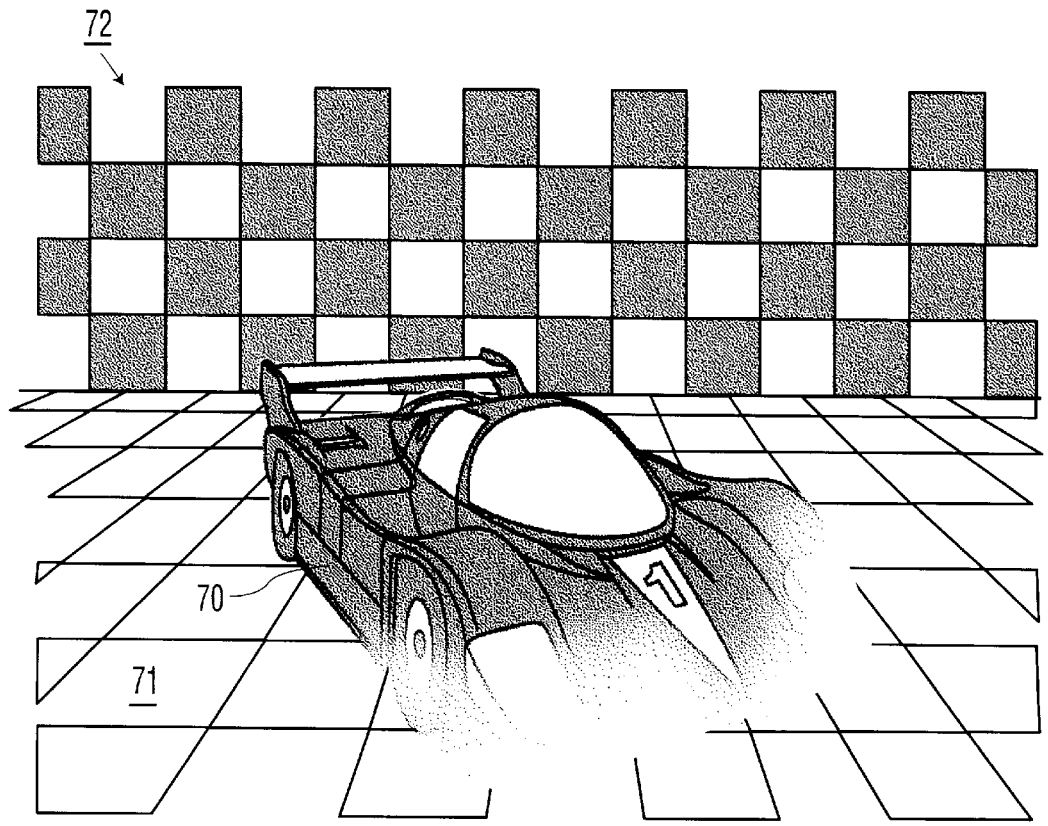

However, the car seems to be floating above its ambience. This effect can be substantially eliminated by providing an additional, dedicated intensity gradation in the partial images. This gradation in a direction which is the vertical direction for the viewer is complementary for the two partial images. As is shown in FIG. 5d, the intensity, or density of pixels in the foil with the racing car, extends from, for example, 100% at the lower side to, for example, 10% at the upper side. For the foil with the ambience shown in FIG. 5e, the intensity for the racing car extends from 100% at the upper side to 10% at the lower side. If the distance between the transparent foils is not too large, for example, between 0.5 and 10 μm for A4 format foils, then a viewer will experience a natural three-dimensional image, also due to the interpolating function of his brain, without a troublesome double image occurring. Moreover, the depth sensation is monocular, so it can also be experienced with one eye and is maintained at larger viewing angles. If there are more depth cues present in the scene to be displayed, such as, for example, a perspective, these cues may enhance the Double-D-Depth effect.

The above-described experimental set-up with stationary images may be transformed to a suitable system for professional or consumer use by replacing the foils by electronically controlled image display devices, such as image display panels or cathode ray tubes. Moving three-dimensional images can then, of course, be displayed by means of such devices. If the images are color images, a color gradation may also be provided in the images instead of, or additionally to the dedicated intensity gradation. The gradations are dependent on the depth cues in the scene.

The dedicated intensity gradations are preferably adapted to each other in such a way that per pixel, the product of these gradations is equal to the intensity in the pixel of the two-dimensional image.

Moreover, the distance between the image surfaces of the image display devices is equal to a fraction f of the diagonal of the surfaces, in which it holds for f that:

$$\frac{1}{1000} \le f \le \frac{1}{10}$$

This choice of the distance prevents the experienced depth from being too exaggerated and thus having a disturbing effect. A disturbing depth experience is entirely prevented in a display system in which it holds for f that:

$$\frac{1}{75} \le f \le \frac{1}{25}$$

Figure 6:
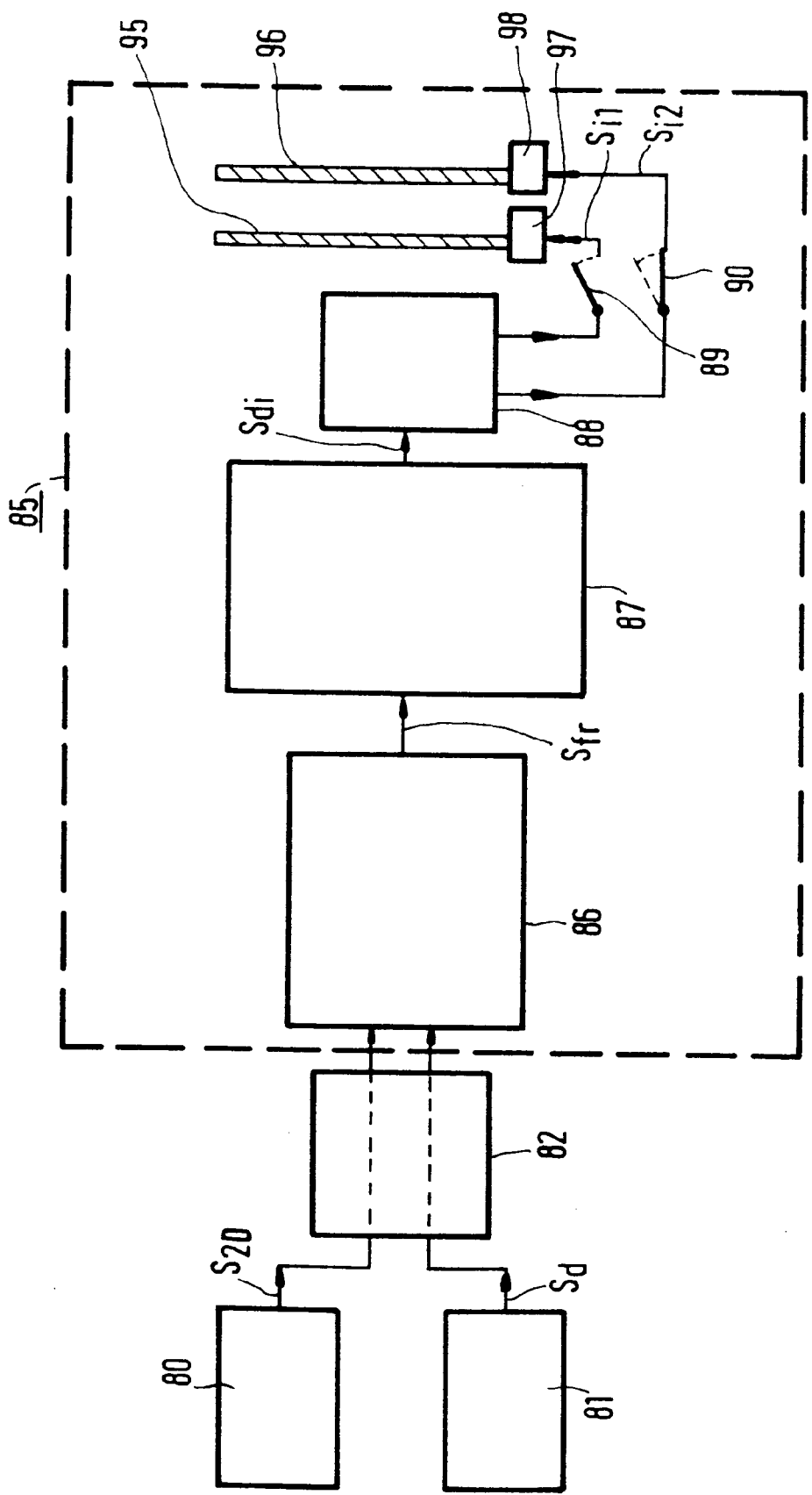
FIG. 6 shows a possible image signal processing and drive mode of the image display devices.

FIG. 6 shows a possible mode of image signal generation and image display for the three-dimensional system according to the invention. At the pick-up side, use is made of a normal camera 80, for example, a video camera with which a two-dimensional pick-up of a scene or object is made and which supplies a two-dimensional image signal $S_{2D}$. Use is also made of a device 81 with which depth information is obtained from the scene and which supplies a depth signal $S_d$. This device is shown as a separate device but may also be integrated with the camera 80. The device 81 may be implemented in various manners. For example, it may comprise an infrared transmitter which emits an infrared beam with which the scene is scanned, and an infrared-sensitive detection device such as a camera tube or CCD sensor, which receives the light reflected by the various scene components and converts it to a depth signal. The device may also be constituted by a camera having an automatically scanning focus setting, in which the control signal for correcting the focus can be used as a depth signal.

Generally, both active and passive depth-sensing means can be used for determining the depth profile of the scene.

The signals $S_{2D}$ and $S_d$ are transferred to the three-dimensional image display system 85 via a transmission medium 82 which, in the case of a television broadcast, is constituted by air and, in the case of a closed TV circuit or a local network, is constituted by electric cables.

The image display system 85 comprises a first processor, or image mixer, 86 in which the signals $S_{2D}$ and $S_d$ are processed to image frames, with depth information being applied to each pixel of said frames. The signal $S_{fr}$ with the image frame information is applied to an image processor 87 in which the image frames are converted to two separate, graded images. The output signal $S_{di}$ of the image processor 87 is applied to an input of a multiplexer 88 which supplies an output signal $S_{di}$ comprising two image signals $S_{i,1}$, $S_{i,2}$. This signal $S_{i,1}$ is applied to a control circuit 97 for a first image display device 95, for example, a display panel 95, which is shown diagrammatically, while the signal $S_{i,2}$ is applied to a control circuit 98 for a second display panel 96.

Switches 89 and 90 may be arranged between the multiplexer 88 and the control circuits 97 and 98, these switches being controllable in such a way that the image display devices display their images in different, separate and consecutive time intervals. This presentation mode is preferred, particularly if the image display devices are transmission panels. The switches 89 and 90 constitute a synchronizing circuit.

Figure 7:
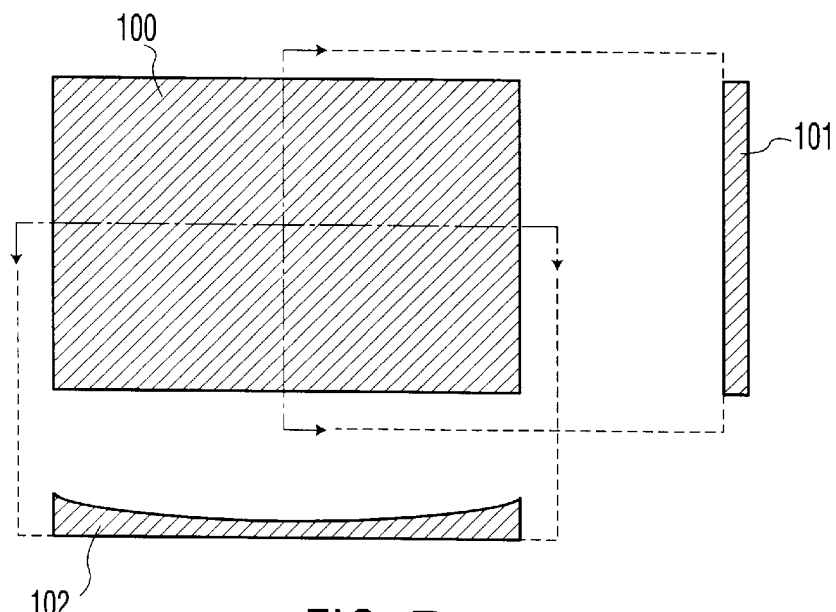
FIGS. 7–10 show embodiments of the image display system, in which curved images are created.

As has been described with reference to FIGS. 5a–5e, the depth effect evoked by the Double-D-Depth is an effect in the vertical direction for the viewer. This effect can be augmented with a depth effect in the horizontal direction by implementing the system in such a way that the image in the horizontal direction is curved. Such an image can be obtained by providing a cylindrical lens whose cylindrical axis is vertical in the path of the light coming from the image display devices. However, the image surface itself is preferably curved in the horizontal direction, as is shown in FIG. 7. This Figure shows an image surface 100 in a front elevational view, as well as its vertical cross-section 101 and its horizontal cross-section 102.

Figure 8:
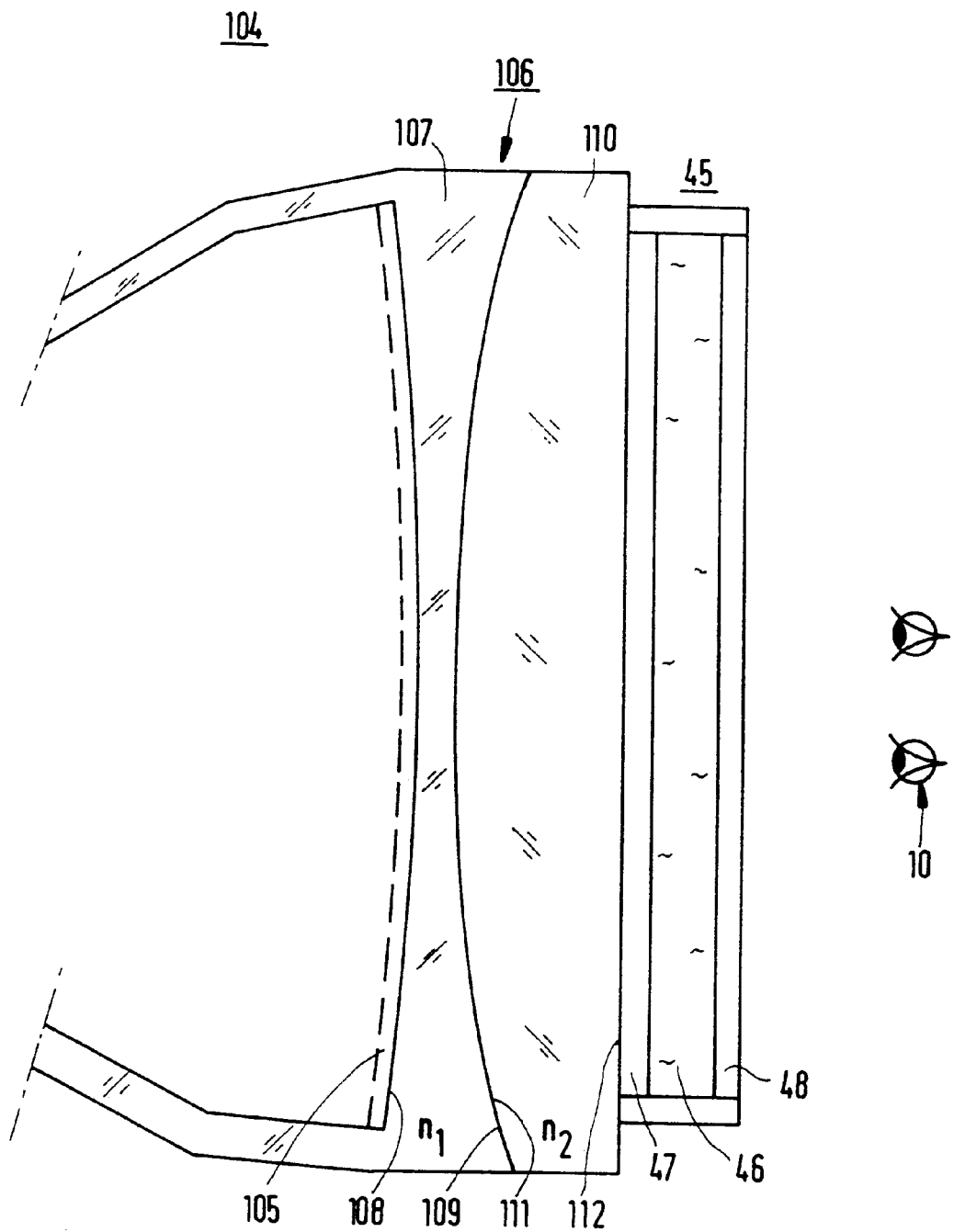

FIG. 8 shows in a horizontal cross-section an adapted cathode ray tube 105 with which an image curved in the horizontal direction can be obtained. To this end the glass screen 106 is composed of two layers 107 and 110. The layer 107 has a first surface 108 with the same curvature as the phosphor layer and the shadow mask 105, this mask defining the face plate. The surface 108 is placed against the phosphor layer. The second surface 109 of the layer 107 has an opposite and stronger curvature than the surface 108. The second layer 110 has a flat outer surface 112 and an inner surface 111 with the same curvature as the surface 109. The first layer 107 has a refractive index n1 and the second layer has a refractive index n2 which is larger than n1 so that the light rays are refracted towards the viewer at the interface 109, 111 between the first and the second layer. It will be evident that FIG. 8 shows the represented part of the system in a horizontal cross-section.

The cathode ray tube may be combined with a display panel in an analogous manner as in FIG. 3, for example, an LCD panel 45 comprising a polarizer 47, a layer of liquid crystalline material 46 and an analyzer 48.

Figure 9:
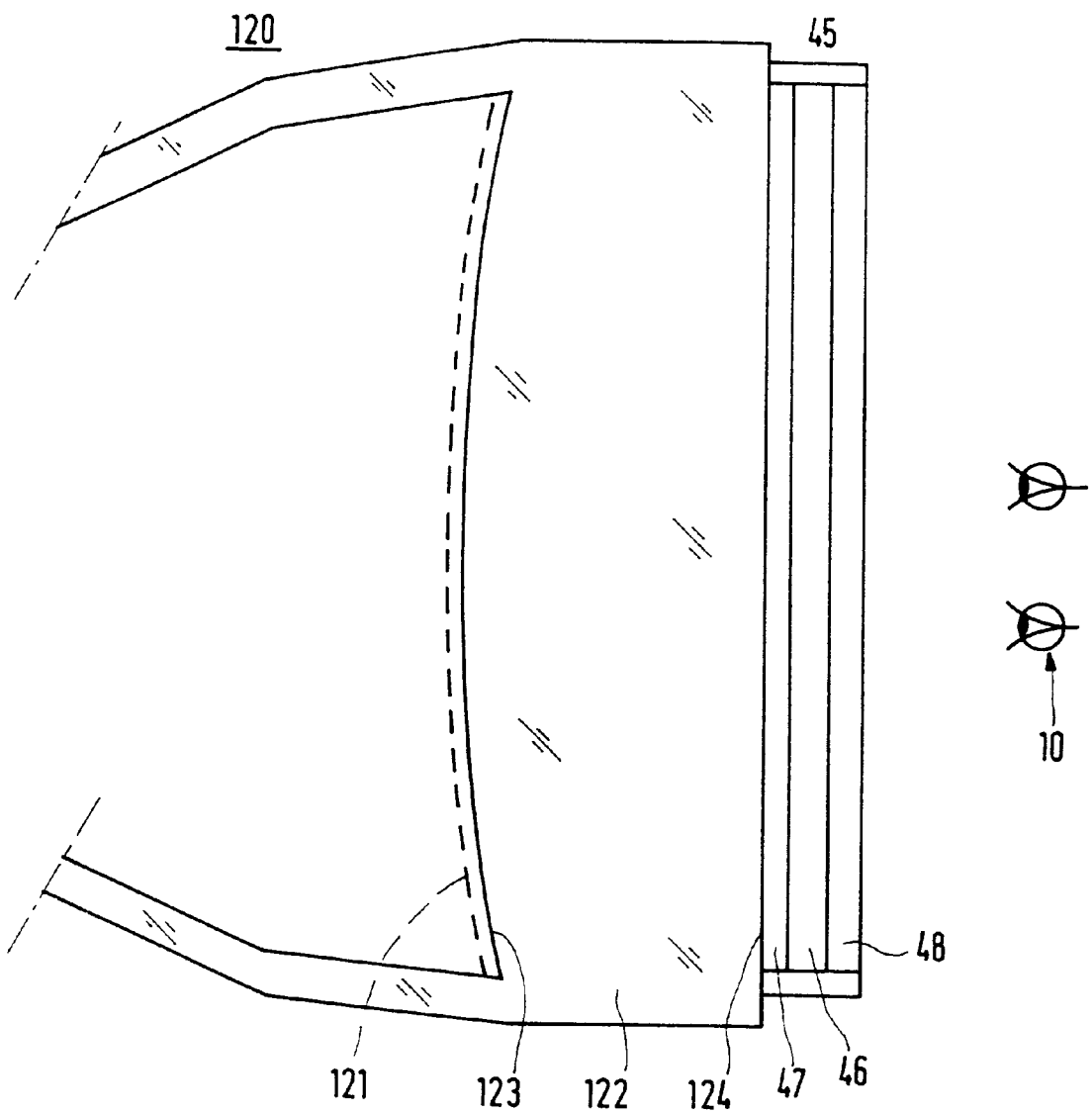

For obtaining the horizontal depth effect, use can also be made of a cathode ray tube whose face plate is concave instead of convex. Such a tube 120 is shown in FIG. 9. The single glass layer 122 has a flat outer surface 124 and an inner surface 123 with the same curvature as the phosphor layer plus the shadow mask 121.

This tube can also be combined with an image display panel 45 in an analogous manner as in FIG. 3. It is alternatively possible to use two cathode ray tubes 104 or 120 as shown in FIG. 8 or in FIG. 9 in the three-dimensional image display system in the same way as is shown in FIG. 1.

Figure 10:
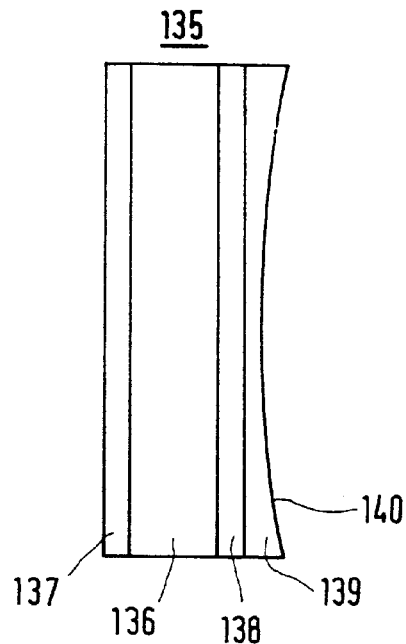

In a system with image display panels, the horizontal depth effect can be obtained by adapting one panel or both panels, as is shown in FIG. 10. FIG. 10 shows a display panel 135 with a polarizer 137, a liquid crystalline layer 136 and an analyzer 138. An extra plate 139 whose outer surface 140 has a concave curvature in the horizontal direction is placed against the analyzer.

Instead of being curved in the horizontal direction, the image obtained by means of the three-dimensional image display system may also be curved in the vertical direction. This provides an additional depth effect in the vertical direction which enhances the Double-D-Depth effect. The image curvature in the vertical direction may be obtained in the same way as that in the horizontal direction and described with reference to FIGS. 7 to 10, which Figures are then vertical instead of horizontal cross-sections.

It is alternatively possible to curve the picture in both the horizontal and the vertical direction. Then, both an enhanced depth effect in the vertical direction and a depth effect in the horizontal direction are obtained.

The above-mentioned additional depth effects may not only be created by actual curvature of the image or an image surface but also by simulating a curvature by means of an additional intensity gradation which is independent of depth information. This curvature simulation may be elucidated with reference to FIGS. 11 and 12.

Figure 11:
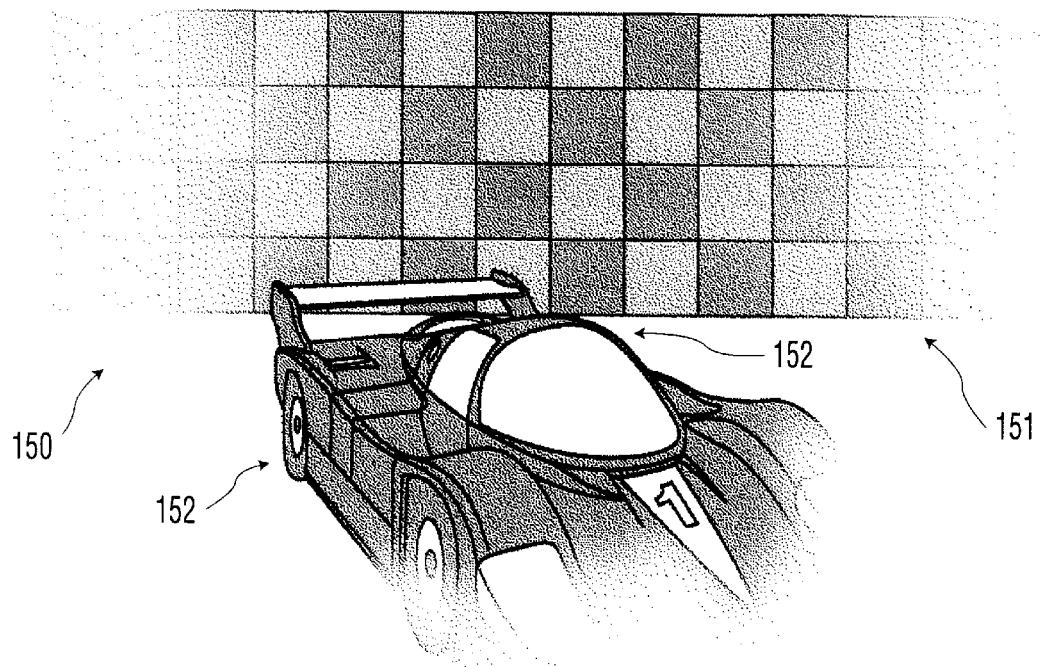
FIGS. 11 and 12 show sub-images with which the display system can simulate a curved image.

FIG. 11 shows a first transparent foil with the same scene as that in FIGS. 5a–5e, in which the left and right sides 150, 151 now have a maximum transparency, for example, near 100%, and the center 152 has a minimum transparency, for example, near 0%. There is a gradual transition from maximum to minimum transparency.

Figure 12:
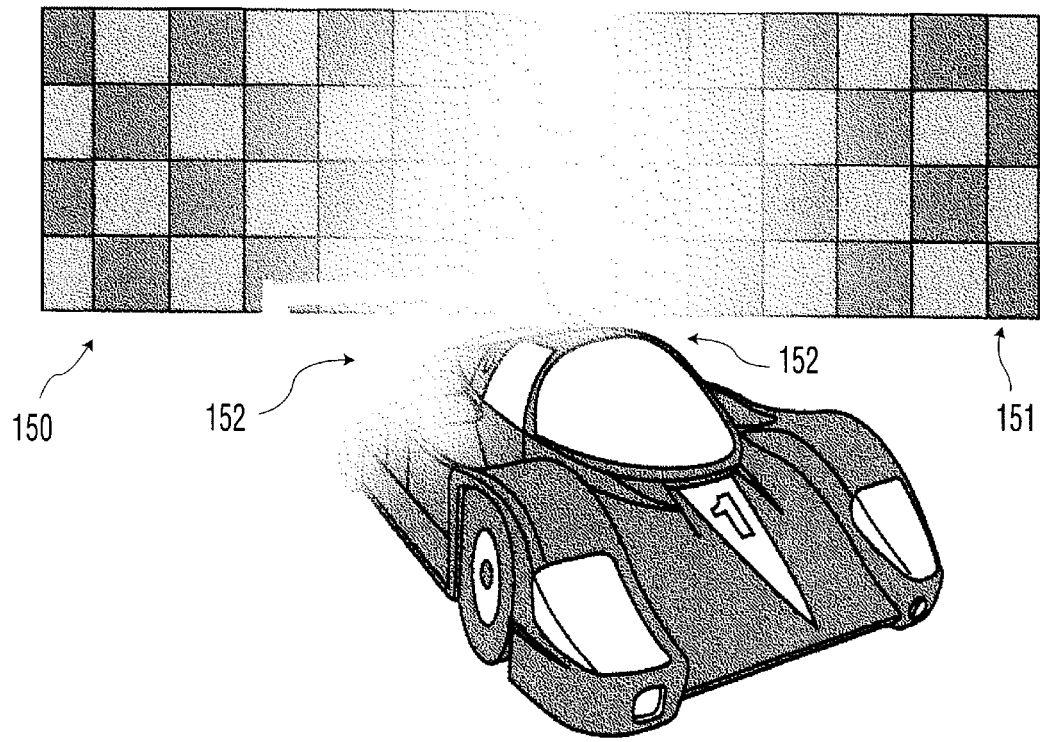

FIG. 12 shows a second transparent foil with the same scene having a transparency variation which is opposed to that of FIG. 11 and which is, for example, near 100% in the center and, for example, near 0% at the left and right sides. If the foil of FIG. 12 is laid on the foil of FIG. 11, while a transparent, for example, glass plate is interpositioned, the impression of a curved image whose edges are closer than the center is produced for a viewer at the side of the foil of FIG. 12.

By displaying the foil presentations by means of electronically controllable image display devices, in which the transparency of the foils is substituted for a corresponding intensity gradation in the displayed images, a system suitable for practical use is obtained, in which a cylindrical lens action is built in, with the axis of the imaginary cylindrical lens being positioned vertically and centrally.

By combining this cylindrical lens-shaped effect with the Double-D-Depth effect, the latter effect can be supplemented with a horizontal depth effect. The extra, depth-independent intensity gradation may be provided in the vertical direction instead of in the horizontal direction, so that the depth sensation created by the Double-D-Depth effect can be enhanced. The extra depth-independent intensity gradation may further be provided in both the horizontal and the vertical direction, which does not only have an enhanced vertical depth effect but also a horizontal depth effect. The latter may alternatively be realized by means of an additional depth-independent, continuously varying intensity gradation in the radial direction.

The invention may not only be used for displaying three-dimensional images of a scene, for example, video images or medical examination images, in which, especially, the distance between scene components and the depth of the scene play a role, but also for visualizing the volume of objects, in which the thickness is particularly important. Particular examples may be graphic systems with which large posters or commercials can be displayed, but specifically also computer-graphic systems. The volume character and the shape of said objects or bodies predominantly become manifest in an increase or decrease of the thickness or height of the observed image. It has been found that the invention is eminently suitable for visualizing gradual thickness variations. To this end, a number of partial images are superimposed in registry, these images representing additional intensity gradations determined by the thickness variations, which gradations of the different images are complementary. Said intensity gradations, which are only present within the contours of the object, now extend in directions perpendicular to the contours of the object instead of horizontally or vertically. This possibility can again be elucidated with reference to a plurality of transparent foils with partial images shown in FIGS. 13b–13e.

Figure 13A:
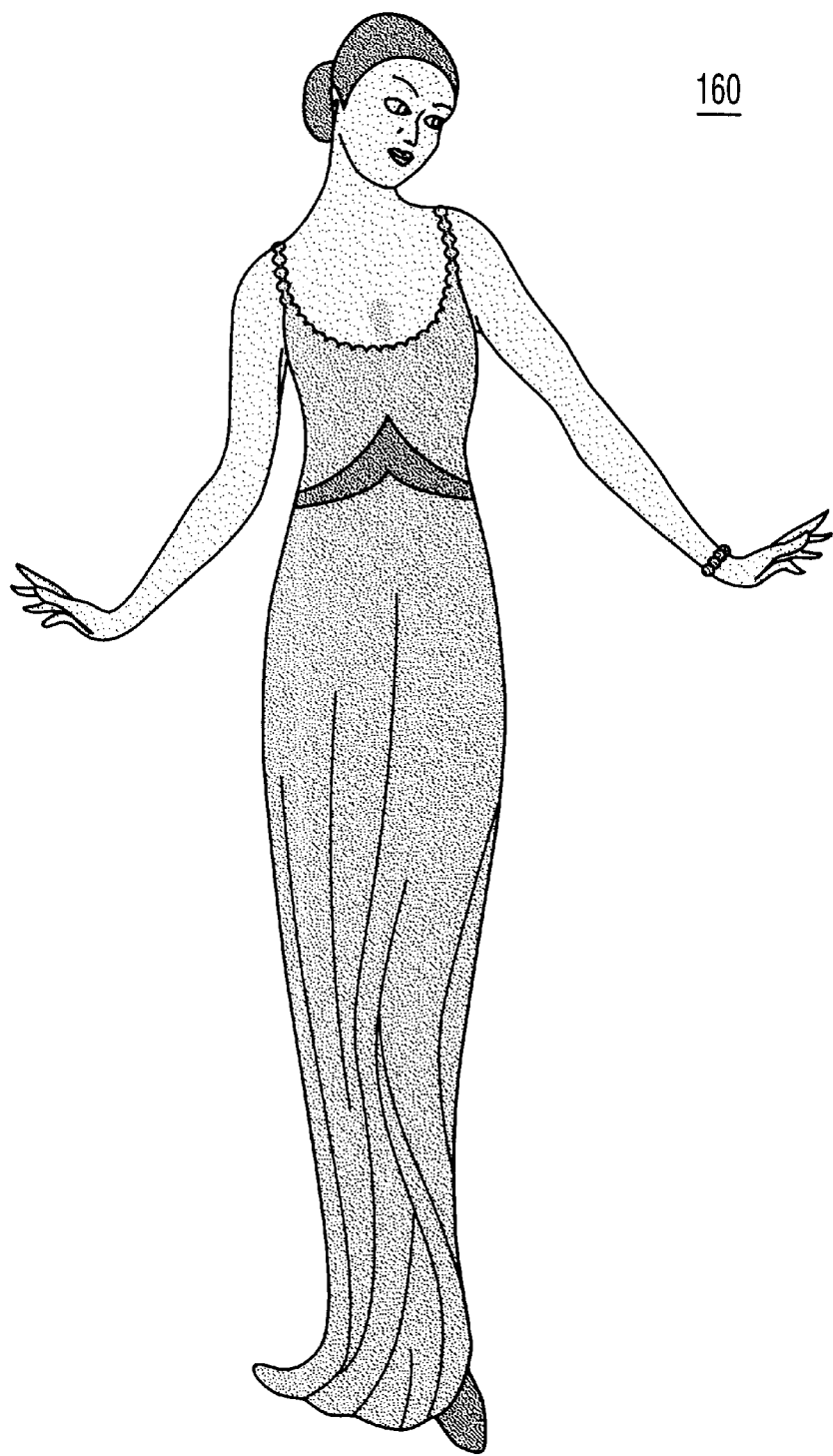
FIGS. 13a–13e show sub-images with which the display system can simulate a volume image.

FIG. 13a shows a two-dimensional image of a show model 160, which image should be displayed as naturally as possible as far as volume and round shapes are concerned. FIGS. 13b–13e show foils of different vertical cross-sections of the model.

Figure 13B:
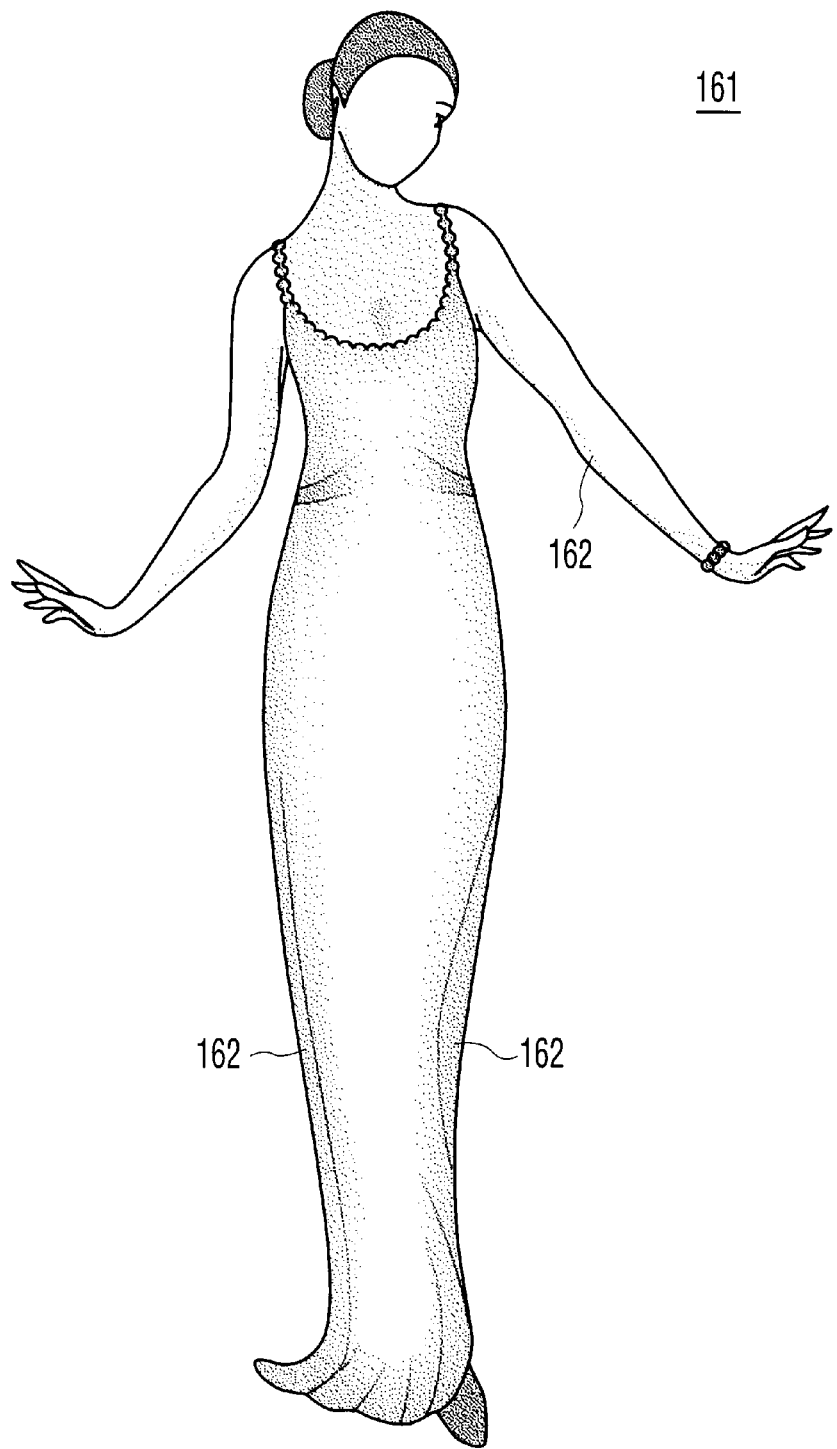
Figure 13C:
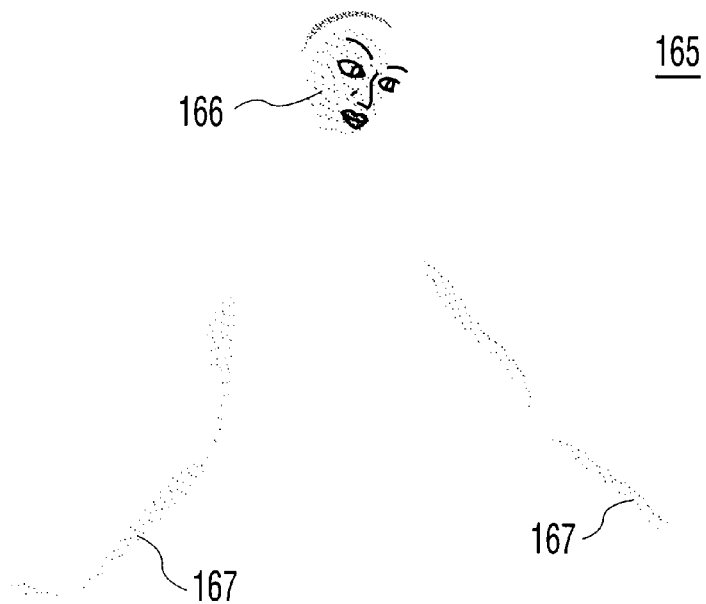
Figure 13D:
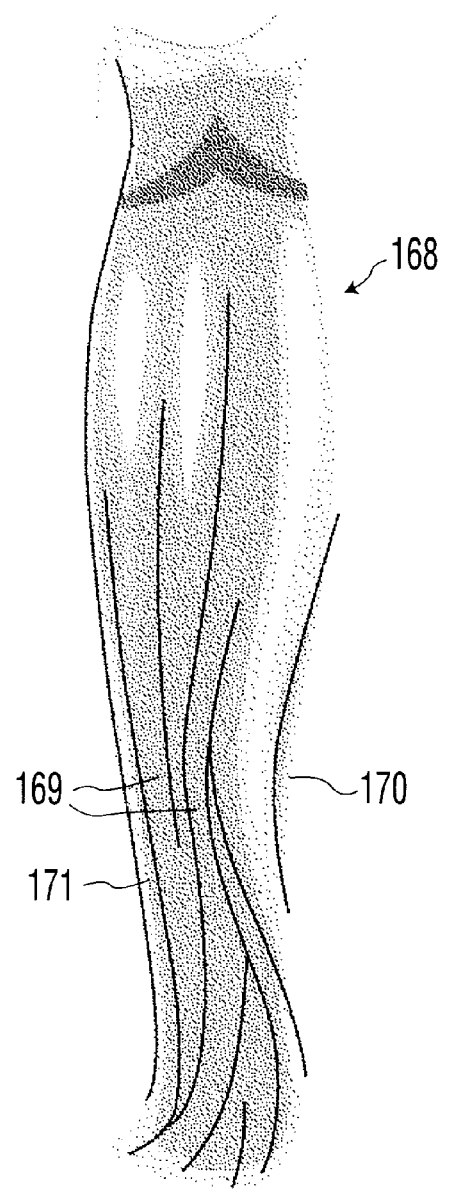
Figure 13E:
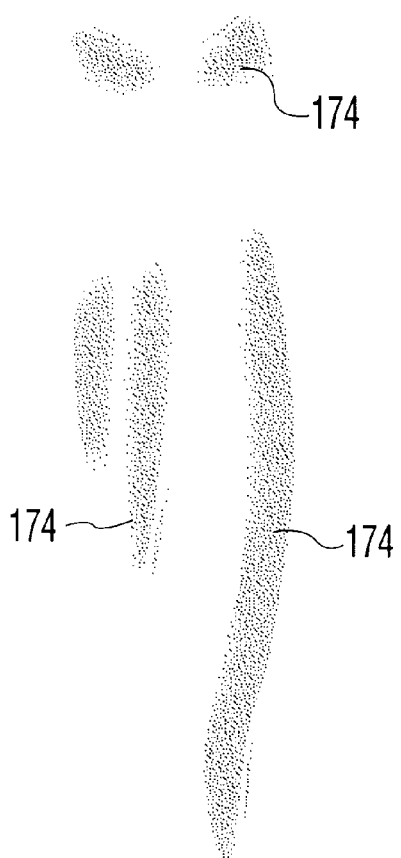

FIG. 13b shows the cross-section 161 comprising the outer contours, and FIG. 13c shows a cross-section 165 showing a part of the head 166 and the arms 167. According to the invention, the contours of cross-section 161 in FIG. 13b are shown by a gradation 162 of the transparency of the foil with that cross-section, which gradation is only present within the contour curves and extends in directions perpendicular to the directions of the contour curves. Also the head and the arms of the cross-section 165 in FIG. 13c are shown by way of such gradations, 166 and 167. If the foil with the cross-section 165 is laid on the foil with the cross-section 161, while a transparent plate of a suitable thickness is interpositioned, a viewer watching the stacked foils from the foil with the cross-section 165 sees a three-dimensional image of mainly the upper part of the model.

To complete the image, the foil with the cross-section 165 may successively be provided with a transparent plate and a further foil (FIG. 13d) with a cross-section 167 showing a large part of the gown of the model. The contours 168 and the pleats 169 of this gown are again represented by transparency gradations 170, 171 extending perpendicularly to these contours and pleats. Finally, the last-mentioned foil may be provided with a further transparent plate and a last foil (FIG. 13e) which is a cross-section 173 with the projecting parts 174 of the gown.

Figure 14:
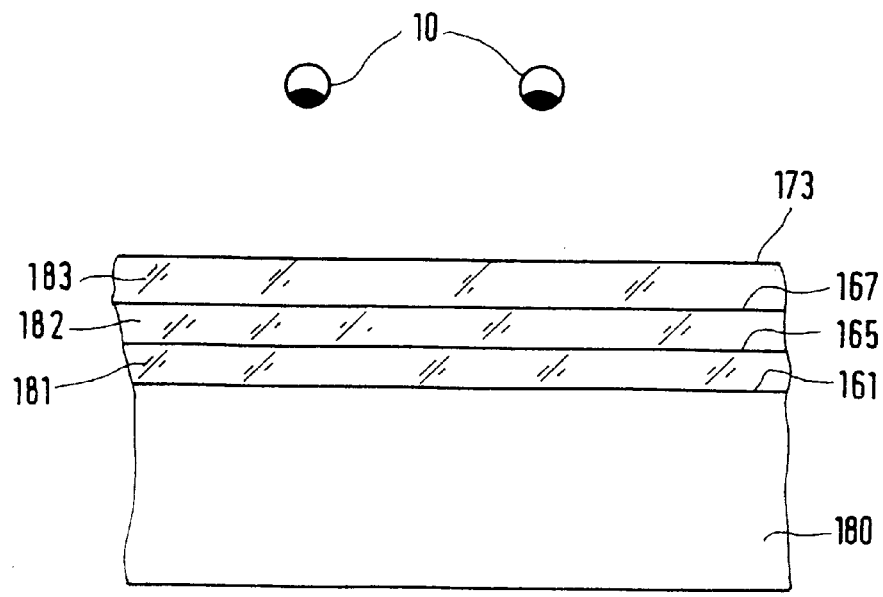
FIG. 14 shows the way in which these sub-images can be stacked.

FIG. 14 shows the above-described stack in a cross-section. In this Figure, the reference numeral 180 denotes an illumination unit, 181, 182 and 183 denote the transparent plates and 161, 165, 167 and 173 denote the cross-sections provided in the foils. When a viewer 10 watches this stack of foils and transparent plates, he will experience a surprisingly good volume image of the model in which even the round shapes of her body are visible.

The experimental set-up described with reference to FIGS. 13a–13e and 14 may be transformed to a practically usable system by using electronically controllable image display devices for displaying the cross-sections, while the transparency gradation is replaced by an intensity gradation.

When the Double-D-Depth principle is used, i.e., when at least two image display devices with a certain space in between are used, parallax should be prevented from occurring in the three-dimensional image formed with these devices, or, in other words, scene components should not be offset when the viewing angle is changed. In accordance with a further aspect of the invention, parallax can be prevented by using only one image display device for displaying the actual image contents, i.e., the two-dimensional image, and by using two image display devices for displaying the depth information, and by displaying the different types of information in different time intervals. This can be illustrated with reference to an experiment with a number of foils having different image contents. These foils, showing the same model as in FIGS. 13a–13e, are shown in FIGS. 15a, 15b and 15c.

Figure 15C:
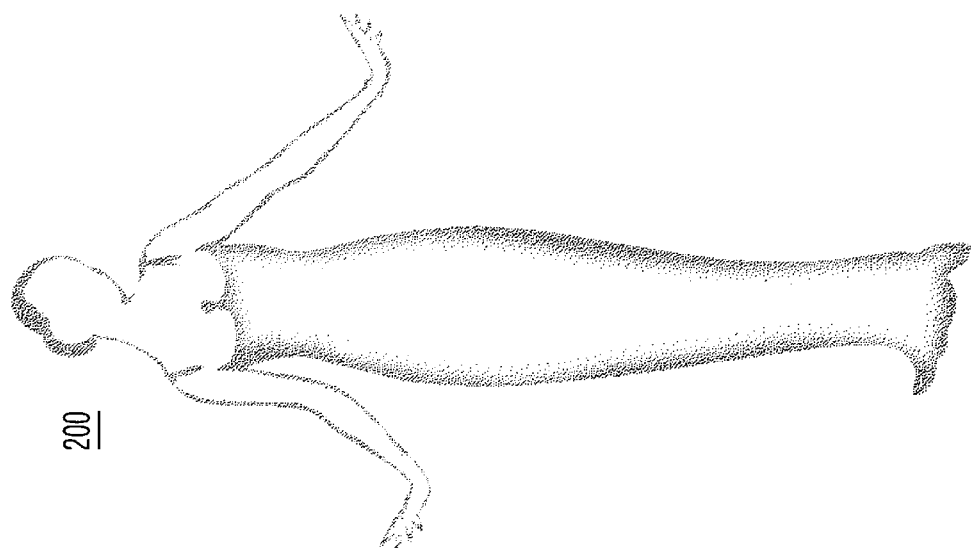
FIGS. 15a–15c show a two-dimensional image and two depth images with which the system can create a three-dimensional image.
Figure 15B:
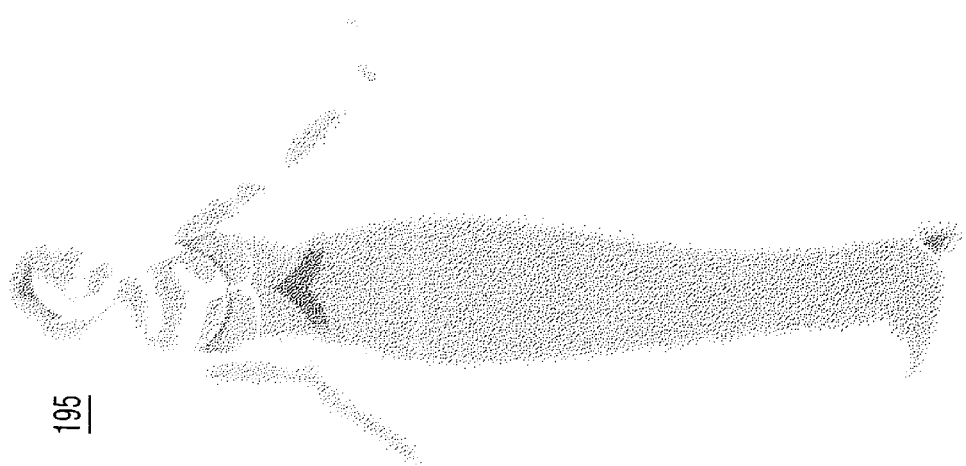
Figure 15A:
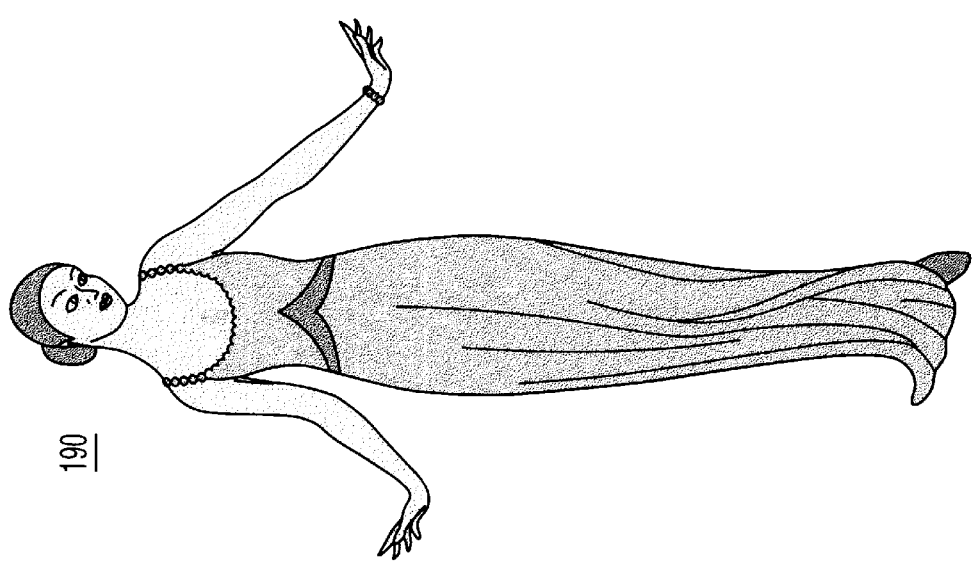

FIG. 15a shows the full two-dimensional image 190 of the model on a first foil.

FIG. 15b shows a first, the front, depth image 195 of the model on a foil which has a transparency gradation defined by the depth cues of the image.

Figure 16:
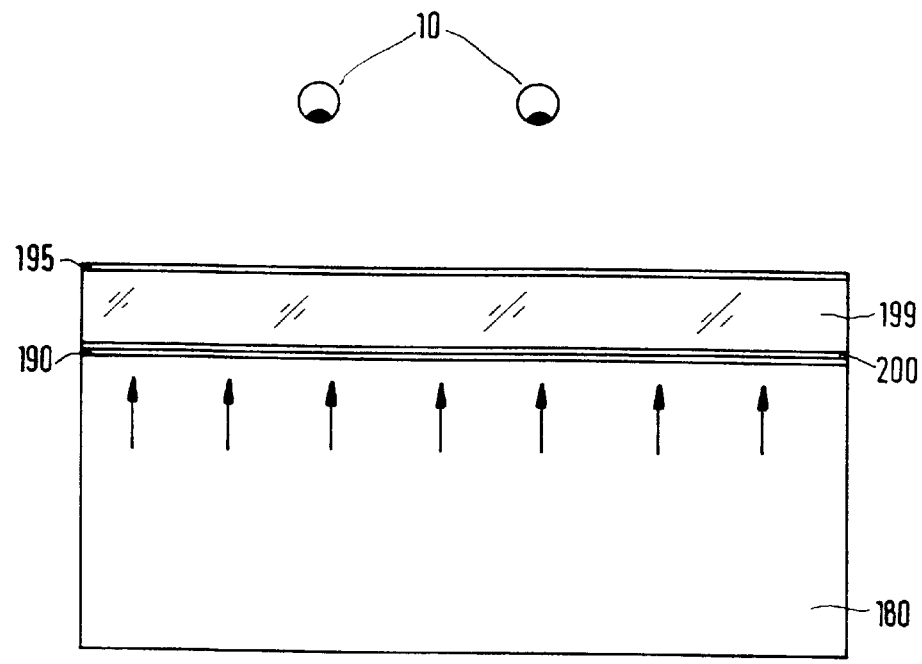
FIG. 16 shows the way in which these images can be stacked.

FIG. 15c shows a second, the rear, depth image of the model with a transparency gradation which is complementary to that of FIG. 15b. If, as shown in FIG. 16, the foil with the image 190, the foil with the image 200, a transparent plate 199 and a foil with the image 195 are successively placed on an illumination unit 180, the viewer 10 will see the full volume of the model.

Figure 17:
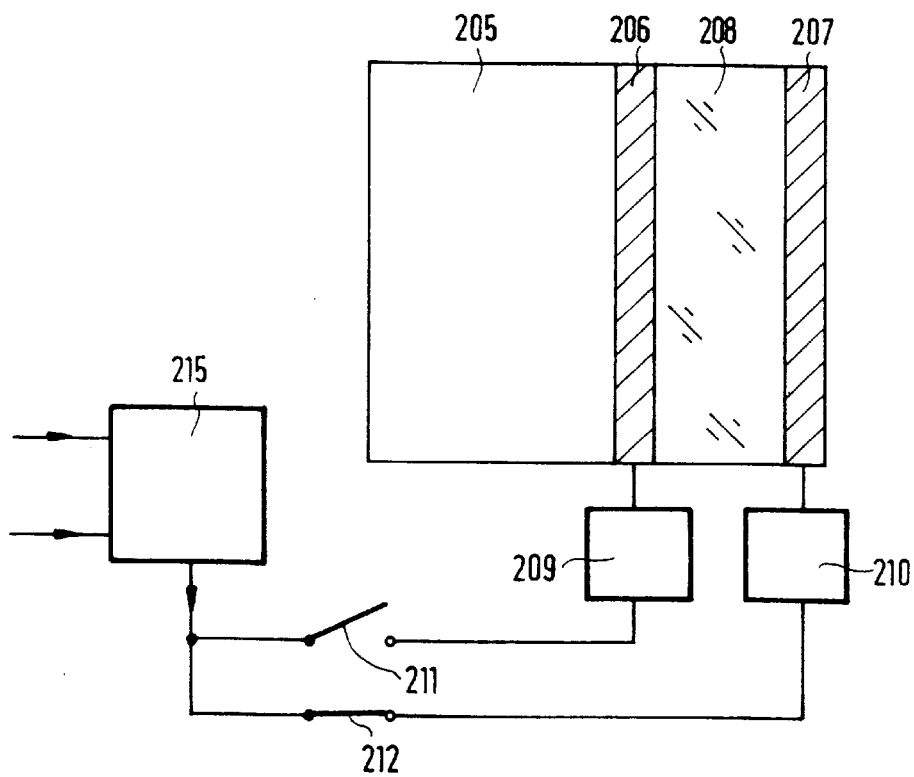
FIG. 17 shows a possible embodiment of the display system in which these images can be displayed one after the other in time.

In analogy with the description hereinbefore, three display devices can be used instead of foils for displaying the images 190, 195 and 200. However, due to the light output and/or compactness of the system, it is much more advantageous to use only two image display devices and a special drive unit for these devices, as is shown in FIG. 17.

In this Figure, the reference numeral 205 denotes an illumination unit and 206 and 207 denote image display devices, for example, PDLC panels with control circuits 209, 210. The medium 208 between the panels may be air or glass. The control circuits 209 and 210 are connected via switches 211, 212 shown diagrammatically to an electronic device which is analogous to that of FIG. 6 and of which only a multiplexer 215 is shown.

The electronic device and switches may be adapted in such a way that the panel 206 displays the two-dimensional image 190 and the panel 207 is maximally transparent in first time intervals of, for example, ¹⁄₁₀₀ sec, whereas the panel 206 displays the depth image 200 and the panel 207 displays the depth image 195 in second time intervals occurring between the first time intervals and also being, for example, ¹⁄₁₀₀ sec long. In this way, the telominance (the depth image) and the actual image contents, or luminance and possible chrominance, are separated in time, and parallax is prevented. Since said time intervals are so short and the switching frequency is so high, a viewer will interpret the depth image and the two-dimensional image as one image so that this viewer sees a natural three-dimensional image, or a full volume image.

The system may also be adapted in such a way that panel 206 displays the two-dimensional image 190 in a first time interval of, for example, ¹⁄₁₀₀ sec again, panel 206 displays the depth image 200 in a second, subsequent time interval and panel 207 displays the depth image 195 in a third, subsequent time interval, whereafter this cycle is repeated. Moreover, Moiré fringing between the depth images can then be prevented.

In practice, there may be a need for adjusting the optical distance between the display panels so as to present the depth contents as naturally as possible.

Figure 18:
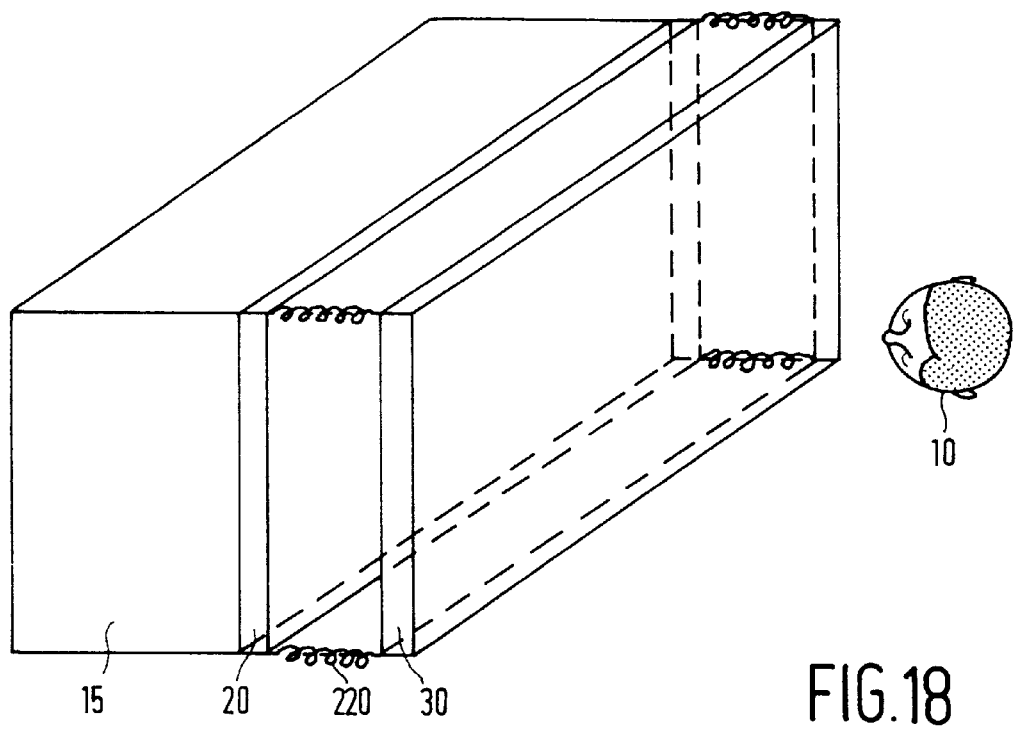
FIG. 18 shows an embodiment of the display system in which the optical path length between the image display devices is adjustable.

FIG. 18 shows an embodiment of the image display system which provides this possibility. This embodiment differs from that in FIG. 2 only in that adjustable spacers 220 are arranged between the first display panel 20 and the second display panel 30. As is shown in FIG. 18, these holders can be constituted by resilient elements which can be adjusted, for example, mechanically or electromechanically by the user of the system. Then the thickness of the medium, which may be air, may be adapted to the user's personal need or preference. Also in the embodiment of FIG. 1, the effective optical distance between the images generated by the tubes can be adjusted by displacing one of the cathode ray tubes along its own axis with respect to the other tube.

Instead of a passive medium, such as air, the space between the image display devices may be an active medium, i.e., a medium whose optical properties can be changed.

Figure 19:
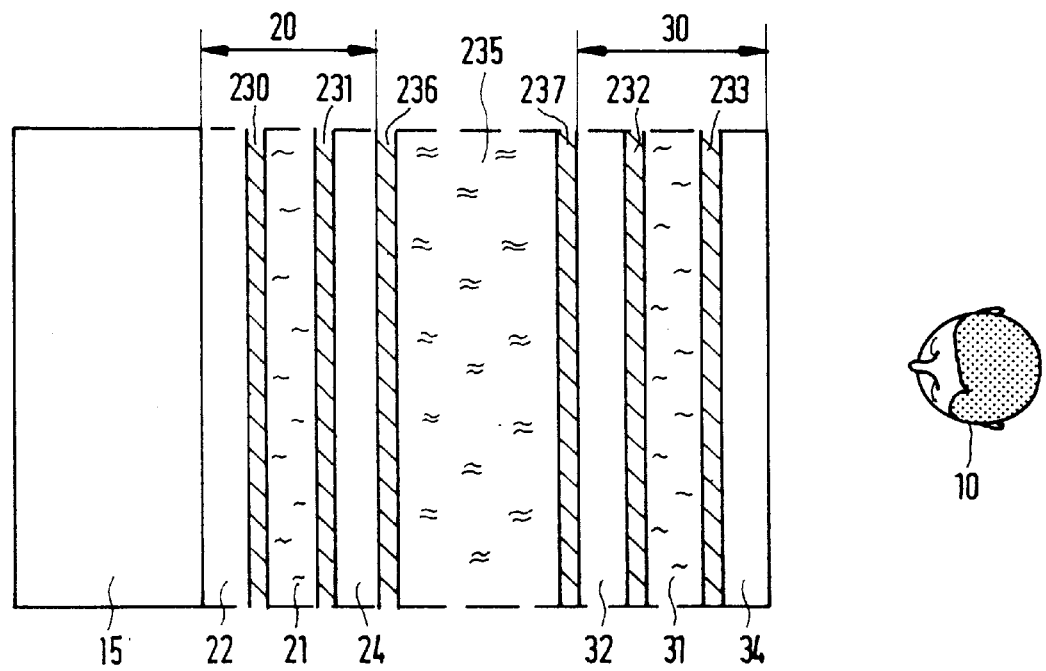
FIG. 19 shows an embodiment of the image display system with an active, controllable medium between the image display panels.

FIG. 19 shows an embodiment of the system in which this is the case. This embodiment is a modification of that of FIG. 2 and comprises an illumination unit 15, a first display panel with a polarizer 22, an analyzer 24 and an interposed liquid crystalline layer 21, or a polymer layer in which drops of liquid crystalline material have been dispersed, and a second, similar image display panel with a polarizer 32, an analyzer 34 and a liquid crystalline layer 31.

FIG. 19 also shows a pair of electrode plates 230, 231 for the layer 21 with which the first panel can be driven pixel by pixel, and a similar pair of electrode plates 232, 233 for the second panel. The reference numeral 235 denotes the active medium between the two display panels. This medium is enclosed between two electrode plates 236 and 237 which may be adapted in such a way that a pixel-sequential, or coarser drive of the medium 235 is possible.

The medium 235 consists of, for example, an electro-optic material, such as a liquid crystalline material, whose refractive index can be varied locally, for example per pixel, so that the optical distance between corresponding pixels of the first and the second panel can be increased or decreased. An optimum depth effect can thus be realized.

The medium 235 may also be a polymer with drops of liquid crystalline material being dispersed therein. By energizing the electrodes, this material can be made scattering locally or in given areas, so that given parts of the three-dimensional image can be accentuated or a background can be shaded.

The medium 235 may alternatively be an electrochromic material, i.e., a material whose color can be changed by applying an electric field across this material. The color contrast can then be changed locally in the displayed image, which may contribute to enhancing the depth sensation, or the volume character of a displayed object or an object in a displayed scene can be accentuated.

The medium 235 may also be an organic elastomer material which is deformed under the influence of an electric field applied across this material so that it acquires some relief. The depth sensation can thus be enhanced, which is particularly effective when visualizing contour interfaces.

Figure 20:
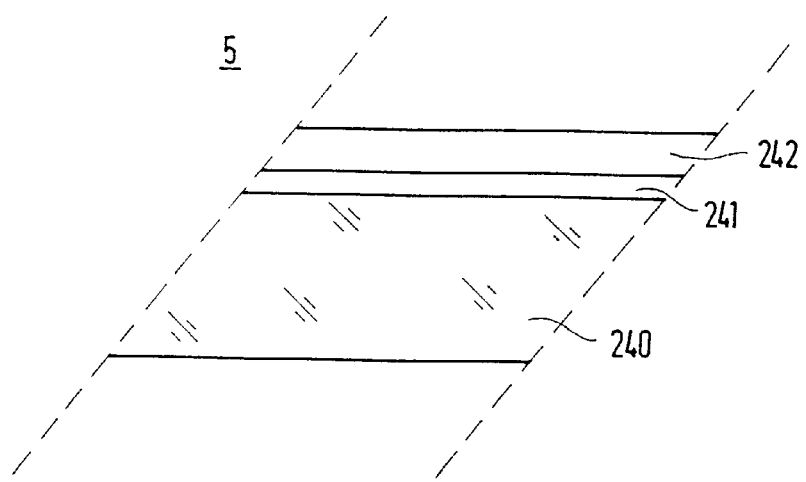
FIG. 20 shows a wide-band semi-transparent mirror for use in the embodiment of FIG. 1.

When a three-dimensional color image is displayed with the system according to FIG. 1, a beam combiner, or dividing mirror 5 must be used which should comply with a number of requirements. For example, this dividing mirror must have the same transmission/reflection coefficient of approximately 50% for the entire visible light wavelength range, and a small absorption, for example, less than 10%, while it should exhibit no color shading or color variation through a large range of viewing angles. This dividing mirror will have to comprise a minimum number of layers and it should be possible to manufacture it by means of technological processes applicable to larger surface areas. It has been found that the dividing mirror, which is shown in a cross-section in FIG. 20, is eminently suitable for use as a dividing mirror 5 in the embodiment of FIG. 2. This dividing mirror comprises a transparent substrate 240 which is only provided with a layer of silver 241 having a thickness of the order of 15–20 nm, and an $SiO_2$ layer 242 having a thickness of the order of 130 nm.

Figure 21:
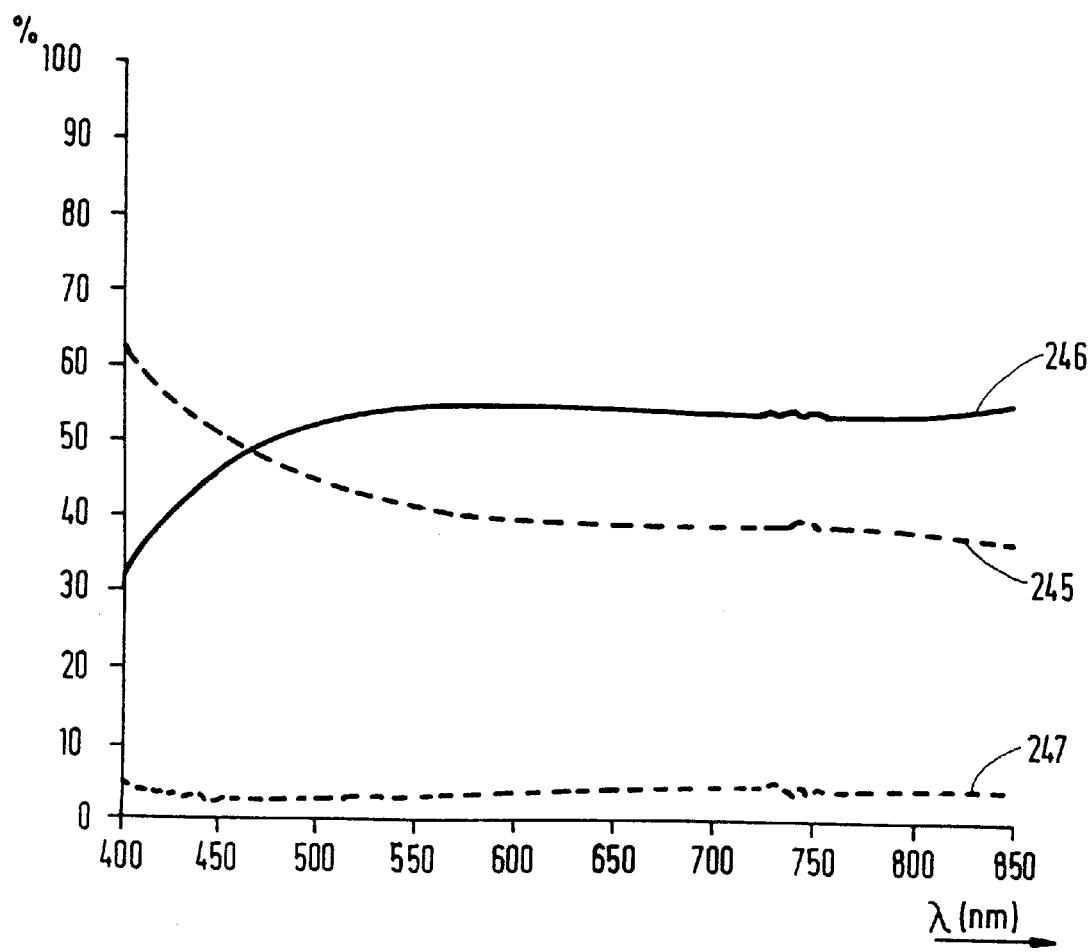
FIG. 21 shows the optical properties of this mirror.

FIG. 21 shows the transmission, the reflection and the absorption, in percents of the incident light, as a function of the wavelength $\lambda$ by way of the curves 245, 246 and 247, respectively. As is apparent from this figure, the optical properties are extremely well constant in the visible light wavelength range, the absorption is extremely low, approximately 5%, and the reflection and transmission coefficients have the right value. Moreover, this dividing mirror exhibits hardly any color shading in a viewing angle range between −45° and +45° with respect to the system axis, and hardly any color variation.

What is claimed is:

1. A three-dimensional image display system comprising:
   a system axis which extends from a light-generating element to an observation window;
   at least two image display devices displaying images at different positions along said system axis, said images having a transparency attribute;
   a control circuit;
   each image display device partially generating and displaying the same two-dimensional image of a three-dimensional scene; and
   a dedicated intensity gradation disposed in at least one of the displayed images, said intensity gradation including parameters relevant to depth representation, said parameters including at least one of depth position of scene components, height of scene components, thickness of scene components and the distance between scene components;
   said dedicated intensity gradation affecting said transparency attribute;
   wherein all displayed images generated by said image display devices together and in combination with the axial distance between the image display devices evoke a depth effect with a viewer.

2. A three-dimensional image display system as claimed in claim 1, characterized in that all images generated by the image display devices have dedicated intensity gradations which are distinct.

3. A three-dimensional image display system as claimed in claim 2, characterized in that the dedicated intensity gradations in the images generated by two consecutive image display devices are complementary to each other.

4. A three-dimensional image display system as claimed in claim 3, characterized in that the product of the dedicated intensity gradations per pixel is equal to the intensity of the original two-dimensional image.

5. A three-dimensional image display system comprising:
   a system axis which extends from a light-generating element to an observation window;
   at least two image display devices which are congruently aligned with each other and placed at different positions along the system axis;
   a control circuit;
   each image display device partially generating and displaying the same two-dimensional image of a three-dimensional scene;
   the distance between the image display devices, viewed from the observation window, being equal to a fraction f of the diagonal of the image surface areas of the image display devices, in which it holds for f that:

$$\frac{1}{1000} \leq f \leq \frac{1}{10}$$

and
   a dedicated intensity gradation disposed in at least one of the displayed images, said intensity gradation including parameters relevant to depth representation, said parameters including at least one of depth position of scene components, height of scene components, thickness of scene components and the distance between scene components;
   wherein all displayed images together and in combination with the axial distance between the image display devices evoke a depth effect with a viewer.

6. A three-dimensional image display system as claimed in claim 5, characterized in that it holds for f that:

$$\frac{1}{75} \leq f \leq \frac{1}{25}.$$

7. A three-dimensional image display system as claimed in claim 1, characterized in that, viewed in the direction of the system axis, the image surface areas of the image display devices extend at an acute angle to each other.

8. A three-dimensional image display system as claimed in claim 1 characterized by a synchronizing circuit for driving the image display devices via their control circuits in such a way that the displayed images are alternately displayed at a frequency which is larger than the frequency which can be observed by a human eye.

9. A three-dimensional image display system as claimed in claim 1, characterized in that the control circuit of each image display device has a first input for receiving a two-dimensional image information signal and a second input for receiving a depth information signal, and in that said control circuit comprises an image mixer for combining said image information and depth information signals into one image signal.

10. A three-dimensional image display system as claimed in claim 1 characterized in that at least one image formed by one of said image display devices is curved in such a way that edges of said image are located closer to the observation window than a centre of said image.

11. A three-dimensional image display system as claimed in claim 1, characterized in that the images generated by the image display devices have a monotonous intensity gradation extending from the centre of the images towards edges of the images, said monotonous intensity gradations in the images of two consecutive image display devices being complementary to each other.

12. A three-dimensional image display system as claimed in claim 11, characterized in that the monotonous intensity gradations in the images extend in a radial direction with respect to the centre of the images.

13. A three-dimensional image display system as claimed in claim 11, characterized in that the monotonous intensity gradations extend in two mutually perpendicular directions which are perpendicular to the system axis.

14. A three-dimensional image display system as claimed in claim 1, wherein the volume of an object having local contour lines can be visualized, said display system further comprising:

object images generated by the image display devices representing different cross-sections of said object in accordance with planes perpendicular to the system axis;

contours of said object being represented by intensity gradations disposed within the circumference of the object images and further disposed in directions transverse to the local contour lines.

15. A three-dimensional image display system as claimed in claim 1 wherein:

a first image display device displays the two-dimensional image in a first set of time intervals and displays a first depth image defined by depth cues in a second set of time intervals, said second set of time intervals located between the first time intervals, and at least a second image display device displays in a third set of time intervals a second depth image defined by depth cues and complementary to the first depth image.

16. A three-dimensional image display system as claimed in claim 1, characterized in that a first and a second image display device are interconnected via adjustable spacers.

17. A three-dimensional image display system as claimed in claim 1 characterized in that a medium between two image display devices has adjustable optical properties.

18. A three-dimensional image display system as claimed in claim 1 characterized in that the image display devices are constituted by cathode ray tubes, in that n-1 beam combiners are provided, in which n is the number of tubes, said beam combiners for combining light beams from the tubes into one beam whose beam axis coincides with the system axis, and in that the dedicated intensity gradations in the images are realized by intensity variations of the electron beams within the tubes.

19. A three-dimensional image display system as claimed in claim 1, characterized in that the image display devices are constituted by image display panels which are arranged one behind the other in the path of an illumination beam supplied by a radiation source and are centred with respect to the system axis, and in that the dedicated intensity gradations in the images of the panels are realised by variations of the light transmissiveness of the panels.

20. A three-dimensional image display system as claimed in claim 1 characterized in that the image display device which is farthest remote from the observation window is constituted by a cathode ray tube, while the other image display devices are constituted by image display panels, and in that the dedicated intensity gradation in the image of the tube is realized by intensity variations in the electron beam within the tube, while the dedicated intensity gradations in images of image display panels are realized by a variation of the light transmissiveness of the panel.

21. A three-dimensional image display system as claimed in claim 18, characterized in that each beam combiner is constituted by a wide-band partially transmissive mirror of a transparent substrate on which a layer of silver and a thicker layer of silicon dioxide are successively provided.

22. A method for displaying a three-dimensional image having scene components and a transparency attribute, said method comprising:

determining a dedicated intensity gradation which affects said transparency attribute; and displaying said scene components and said dedicated intensity gradation on at least two image display devices, thereby creating the effect of depth in said image.

23. A three-dimensional image display system comprising:

a system axis;

at least two image display devices displaying respective images at different positions along the system axis, each image display device partially generating and displaying the same two-dimensional image of a three-dimensional scene, each image having a transparency attribute; and a dedicated intensity gradation disposed in at least one of the displayed images;

said dedicated intensity gradation affecting said transparency attribute;

wherein all displayed images generated by said image display devices together and in combination with an axial distance between the image display devices evoke a depth effect with a viewer.

24. The three-dimensional image display system of claim 23 wherein:

an image to be displayed includes scene components; and said dedicated intensity gradation is based on at least one of depth position of said scene components, height of said scene components, thickness of said scene components, and the distance between said scene components.

* * * * *